US012538259B2

(12) United States Patent
Ren et al.

(10) Patent No.: US 12,538,259 B2
(45) Date of Patent: Jan. 27, 2026

(54) METHOD AND APPARATUS FOR POSITIONING TERMINAL DEVICE, AND STORAGE MEDIUM

(71) Applicant: DATANG MOBILE COMMUNICATIONS EQUIPMENT CO.,LTD., Beijing (CN)

(72) Inventors: Bin Ren, Beijing (CN); Xiaotao Ren, Beijing (CN); Zheng Zhao, Beijing (CN); Ren Da, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 328 days.

(21) Appl. No.: 18/557,050

(22) PCT Filed: Feb. 15, 2022

(86) PCT No.: PCT/CN2022/076373
§ 371 (c)(1),
(2) Date: Oct. 25, 2023

(87) PCT Pub. No.: WO2022/227796
PCT Pub. Date: Nov. 3, 2022

(65) Prior Publication Data
US 2024/0259985 A1    Aug. 1, 2024

(30) Foreign Application Priority Data

Apr. 27, 2021    (CN) .......................... 202110460714.0

(51) Int. Cl.
*H04Q 7/22*    (2006.01)
*H04L 5/00*    (2006.01)
(Continued)

(52) U.S. Cl.
CPC ........... *H04W 64/00* (2013.01); *H04L 5/0051* (2013.01); *H04W 8/22* (2013.01); *H04W 28/0268* (2013.01)

(58) Field of Classification Search
CPC . H04W 64/00; H04W 64/003; H04W 72/543; H04W 8/22; H04W 28/0268
See application file for complete search history.

(56) References Cited

U.S. PATENT DOCUMENTS

| 8,019,318 B2 * | 9/2011 | Yoon .................... H04W 52/283 |
| | | 455/404.2 |
| 12,326,507 B2 * | 6/2025 | Fischer .................. H04W 24/10 |

(Continued)

FOREIGN PATENT DOCUMENTS

| CN | 102196558 A | 9/2011 |
| CN | 110913473 A | 3/2020 |

(Continued)

OTHER PUBLICATIONS

ISA State Intellectual Property Office of the People's Republic of China, International Search Report and written opinion issued in Application No. PCT/CN2022/076373, Apr. 19, 2022, WIPO, 14 pages.

(Continued)

*Primary Examiner* — Tuan Pham
(74) *Attorney, Agent, or Firm* — KILPATRICK TOWNSEND & STOCKTON LLP

(57) ABSTRACT

Provided are a method and an apparatus for positioning a terminal device, and a storage medium. The method includes: a first network element receiving a first message from the terminal device, the first message includes positioning quality of service QoS information; transmitting a second message to a first network device, the second message includes the positioning QoS information or initial positioning assistance data corresponding to the positioning (Continued)

QoS information; receiving first target positioning assistance data transmitted by the first network device, and transmitting the first target positioning assistance data to a second network device, the first target positioning assistance data is associated with the positioning QoS information; receiving a first positioning measurement from the first network device and a second positioning measurement from the second network device; and determining location information of the terminal device according to the first positioning measurement and the second positioning measurement.

20 Claims, 11 Drawing Sheets

(51) Int. Cl.
  *H04W 8/22* (2009.01)
  *H04W 28/02* (2009.01)
  *H04W 64/00* (2009.01)

(56) References Cited

U.S. PATENT DOCUMENTS

| | | | |
|---|---|---|---|
| 12,356,462 B2 * | 7/2025 | Lee | G01S 13/765 |
| 2014/0080506 A1 | 3/2014 | Siomina | |
| 2018/0132061 A1 | 5/2018 | Bitra et al. | |
| 2020/0154240 A1 | 5/2020 | Edge et al. | |

FOREIGN PATENT DOCUMENTS

| | | |
|---|---|---|
| CN | 111565414 A | 8/2020 |
| CN | 111818552 A | 10/2020 |
| CN | 112602357 A | 4/2021 |
| WO | 2017026672 A1 | 2/2017 |
| WO | 2020064120 A1 | 4/2020 |
| WO | 2020092714 A1 | 5/2020 |
| WO | 2020193853 A1 | 10/2020 |
| WO | 2020207222 A1 | 10/2020 |
| WO | 2021029960 A1 | 2/2021 |

OTHER PUBLICATIONS

Nokia et al.,"Latency enhancement to on-demand PRS functionality", 3GPP TSG-RAN WG2 Meeting #113bis Electronic, Elbonia, Apr. 12-20, 2021, total 3 pages, R2-2103999.
Patent Office of Taiwan, Office Action Issued in Application No. 111114399, Nov. 23, 2022, 58 pages.
Patent Office of Taiwan, Notice of allowance Issued in Application No. 111114399, Jul. 18, 2023, 5 pages.
State Intellectual Property Office of China (CNIPA), "Second Office Action," Application No. 202110460714.0, issued to Zontan Mobile Communication Devices, Inc. for invention titled 'Positioning Method, Apparatus and Storage,' Notification Date: Mar. 31, 2025, 18 pages.
Huawei, HiSilicon (Rapporteur of Summary), "Summary of AI 8.11.4 for on-demand PRS request," 3GPP TSG-RAN WG2 Meeting #113bis-e, Electronic Meeting, Apr. 12-20, 2021, Agenda Item: 8.11.4, (Discussion and Decision), total 23 pages, R2-2104507.
European Patent Office, Extended European Search Report Issued in Application No. 22794276.0, Aug. 16, 2024, Germany, 12 pages.
CATT,"Discussion on on-demand PRS", 3GPP TSG-RAN WG2 Meeting #113bis electronic, Online, Apr. 12-20, 2021, total 6 pages, R2-2102927.
State Intellectual Property Office of the People's Republic of China, Office Action and Search Report Issued in Application No. 202110460714.0, Oct. 18, 2024, 17 pages.

* cited by examiner

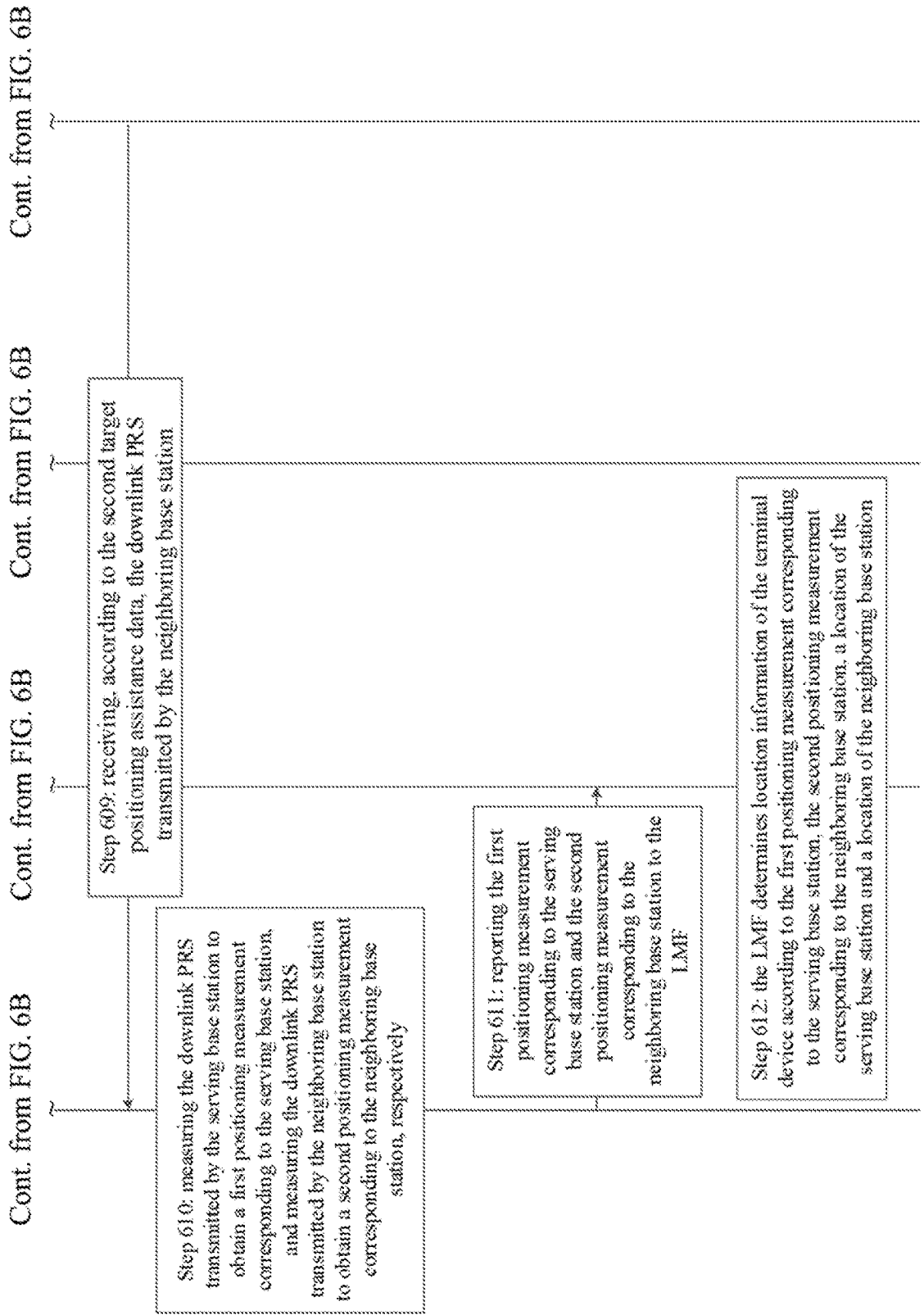

METHOD AND APPARATUS FOR POSITIONING TERMINAL DEVICE, AND STORAGE MEDIUM

This application is a National Stage of International Application No. PCT/CN2022/076373, filed on Feb. 15, 2022, which claims priority to Chinese Patent Application No. 202110460714.0, filed with the China National Intellectual Property Administration on Apr. 27, 2021 and entitled "METHOD AND APPARATUS FOR POSITIONING TERMINAL DEVICE, AND STORAGE MEDIUM". The two applications are incorporated herein by reference in their entireties.

FIELD

The present application relates to the field of communication technology and, in particular, to a method and an apparatus for positioning a terminal device, and a storage medium.

BACKGROUND

Location based services (Location based services, LBS) technology is a service technology according to which location information of a terminal is acquired over a wireless communication network or other positioning system, and then various types of location-related information is provided for the terminal in combination with a geographic information system.

In the fifth generation mobile communication technology (5th-Generation, 5G) positioning network architecture, a location management function (Location Management Function, LMF) entity will determine a method for positioning a terminal device to be positioned. In addition, a serving base station and a non-serving base station will determine positioning assistance data corresponding to the aforementioned positioning method, and transmit the positioning assistance information to the LMF to enable the LMF to determine location information of the terminal device. The positioning assistance data includes a time-frequency resource configuration, a period, and a noise suppression (Muting) mechanism of a positioning reference signal (Positioning Reference Signal, PRS)/a sounding reference signal (Sounding Reference Signal, SRS).

However, the aforementioned positioning method will incur high overheads for system resources, to result in a waste of resources.

SUMMARY

The present application provides a method and an apparatus for positioning a terminal device, and provides a storage medium, and not only the positioning precision and the positioning latency can be ensured for the terminal device, but also overheads for system resources and a waste of resources can be reduced.

In one embodiment of the present application provides a method for positioning a terminal device, the method being applied to a first network element and including:
  receiving a first message from the terminal device, where the first message includes positioning quality of service QoS information;
  transmitting a second message to a first network device, where the second message includes the positioning QoS information or initial positioning assistance data corresponding to the positioning QoS information;
  receiving first target positioning assistance data transmitted by the first network device, and transmitting the first target positioning assistance data to a second network device, where the first target positioning assistance data is associated with the positioning QoS information;
  receiving a first positioning measurement from the first network device and a second positioning measurement from the second network device, where the first positioning measurement is obtained upon measurement performed by the first network device on an uplink positioning reference signal after receiving the uplink positioning reference signal according to the first target positioning assistance data, and the second positioning measurement is obtained upon measurement performed by the second network device on the uplink positioning reference signal after receiving the uplink positioning reference signal according to the first target positioning assistance data; and
  determining location information of the terminal device according to the first positioning measurement and the second positioning measurement.

In the present scheme, the first network device, when assigning the first target positioning assistance data to the terminal device, may consider positioning QoS information of each terminal device, and assign corresponding first target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

In a possible implementation, the second message includes initial positioning assistance data corresponding to the positioning QoS information;
  before the transmitting the second message to the first network device, the method further includes:
  determining a value of a configuration parameter corresponding to the positioning QoS information according to a pre-stored association relationship among the positioning QoS information, a configuration parameter of a positioning reference signal and a threshold value corresponding to the configuration parameter; and
  determining the value of the configuration parameter as the initial positioning assistance data.

In the present scheme, the first network element can determine the value of the configuration parameter corresponding to the positioning QoS information according to the pre-stored association relationship among the positioning QoS information, the configuration parameter of the positioning reference signal and the threshold value corresponding to the configuration parameter, and determine the value as the initial positioning assistance data, and the positioning assistance data can be associated with the positioning QoS information of the terminal device, to avoid a phenomenon in the prior art that all terminal devices are uniformly assigned with positioning assistance data. Instead, the positioning QoS information of each terminal device is considered, and corresponding positioning assistance data is assigned to the terminal device, and not only the positioning precision and the positioning latency can be ensured for the terminal device, but also overheads for system resources and a waste of resources can be reduced.

In a possible implementation, the first message further includes capability information of the terminal device;
the method further includes:
updating the threshold value corresponding to the configuration parameter according to the capability information of the terminal device.

In the present scheme, since the first network element can update the threshold value corresponding to the configuration parameter according to the capability information of the terminal device, it is possible to avoid a phenomenon that all terminal devices use a same threshold value, therefore, not only the flexibility of threshold value selection is improved for the configuration parameter, but also a different threshold value can be determined for each terminal device, to improve the accuracy of positioning assistance data.

In a possible implementation, the second message further includes an association relationship among the positioning QoS information, a configuration parameter of a positioning reference signal and a threshold value corresponding to the configuration parameter.

In the present scheme, since the first network element can transmit an association relationship among the positioning QoS information, a configuration parameter of a positioning reference signal and a threshold value corresponding to the configuration parameter to the first network device in advance, and the first network device will store the association relationship locally, and the first network device can directly determine initial positioning assistance data according to the association relationship after receiving the positioning QoS information transmitted by the first network element, and thus each time when determining the initial positioning assistance data, there is no need for the first network element to transmit the association relationship to the first network device, therefore, the efficiency of determining the initial positioning assistance data can be improved.

In a possible implementation, the second message further includes the updated threshold value corresponding to the configuration parameter.

In the present scheme, the first network element, after updating the threshold value corresponding to the configuration parameter according to the capability information of the terminal device, transmits the updated threshold value to the first network device, therefore, not only the flexibility of threshold value selection is improved for the configuration parameter, but also a different threshold value can be determined for each terminal device, to improve the accuracy of the determined positioning assistance data.

In a possible implementation, the terminal device is at least two in number;
the method further includes:
acquiring a priority of each terminal device of at least two terminal devices;
the determining the value of the configuration parameter corresponding to the positioning QoS information according to the pre-stored association relationship among the positioning QoS information, the configuration parameter of the positioning reference signal and the threshold value corresponding to the configuration parameter includes:
determining positioning QoS information of a terminal device of the at least two terminal devices with a highest or lowest priority as target positioning QoS information; and
determining a value of a configuration parameter corresponding to the target positioning QoS information according to the pre-stored association relationship among the positioning QoS information, the configuration parameter of the positioning reference signal and the threshold value corresponding to the configuration parameter.

In the present scheme, the first network element can determine final target positioning QoS information according to respective priorities of the at least two terminal devices, and the corresponding initial positioning assistance data can be determined, to improve the accuracy of the initial positioning assistance data.

In another embodiment of the present application provides a method for positioning a terminal device, the method being applied to a first network element and including:
receiving a first message from the terminal device, where the first message includes positioning quality of service QoS information;
transmitting a second message to a first network device and a second network device respectively, where the second message includes the positioning QoS information or initial positioning assistance data corresponding to the positioning QoS information;
receiving first target positioning assistance data transmitted by the first network device and second target positioning assistance data transmitted by the second network device, respectively, where both the first target positioning assistance data and the second target positioning assistance data are associated with the positioning QoS information;
transmitting the first target positioning assistance data and the second target positioning assistance data to the terminal device;
receiving a first positioning measurement and a second positioning measurement transmitted by the terminal device, where the first positioning measurement is obtained by the terminal device by receiving, according to the first target positioning assistance data, a first downlink positioning reference signal transmitted by the first network device and measuring the first downlink positioning reference signal, and the second positioning measurement is obtained by the terminal device by receiving, according to the second target positioning assistance data, a second downlink positioning reference signal transmitted by the second network device and measuring the second downlink positioning reference signal; and
determining location information of the terminal device according to the first positioning measurement and the second positioning measurement.

In the present scheme, the first network device, when assigning the first target positioning assistance data to the terminal device, may consider positioning QoS information of each terminal device, and assign corresponding first target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

In a possible implementation, the second message includes initial positioning assistance data corresponding to the positioning QoS information;

before the transmitting the second message to the first network device and the second network device respectively, the method further includes:
determining a value of a configuration parameter corresponding to the positioning QoS information according to a pre-stored association relationship among the positioning QoS information, a configuration parameter of a positioning reference signal and a threshold value corresponding to the configuration parameter; and
determining the value of the configuration parameter as the initial positioning assistance data.

In the present scheme, the first network element can determine the value of the configuration parameter corresponding to the positioning QoS information according to the pre-stored association relationship among the positioning QoS information, the configuration parameter of the positioning reference signal and the threshold value corresponding to the configuration parameter, and determine the value as the initial positioning assistance data, and the positioning assistance data can be associated with the positioning QoS information of the terminal device, to avoid a phenomenon in the prior art that all terminal devices are uniformly assigned with positioning assistance data. Instead, the positioning QoS information of each terminal device is considered, and corresponding positioning assistance data is assigned to the terminal device, and not only the positioning precision and the positioning latency can be ensured for the terminal device, but also overheads for system resources and a waste of resources can be reduced.

In a possible implementation, the first message further includes capability information of the terminal device;
the method further includes:
updating the threshold value corresponding to the configuration parameter according to the capability information of the terminal device.

In the present scheme, since the first network element can update the threshold value corresponding to the configuration parameter according to the capability information of the terminal device, it is possible to avoid a phenomenon that all terminal devices use a same threshold value, therefore, not only the flexibility of threshold value selection is improved for the configuration parameter, but also a different threshold value can be determined for each terminal device, to improve the accuracy of positioning assistance data.

In a possible implementation, the second message further includes an association relationship among the positioning QoS information, a configuration parameter of a positioning reference signal and a threshold value corresponding to the configuration parameter.

In the present scheme, since the first network element can transmit an association relationship among the positioning QoS information, a configuration parameter of a positioning reference signal and a threshold value corresponding to the configuration parameter to the first network device in advance, and the first network device will store the association relationship locally, and the first network device can directly determine initial positioning assistance data according to the association relationship after receiving the positioning QoS information transmitted by the first network element, and thus each time when determining the initial positioning assistance data, there is no need for the first network element to transmit the association relationship to the first network device, therefore, the efficiency of determining the initial positioning assistance data can be improved.

In a possible implementation, the second message further includes the updated threshold value corresponding to the configuration parameter.

In the present scheme, the first network element, after updating the threshold value corresponding to the configuration parameter according to the capability information of the terminal device, transmits the updated threshold value to the first network device, therefore, not only the flexibility of threshold value selection is improved for the configuration parameter, but also a different threshold value can be determined for each terminal device, to improve the accuracy of the determined positioning assistance data.

In a possible implementation, the terminal device is at least two in number;
the method further includes:
acquiring a priority of each terminal device of at least two terminal devices;
the determining the value of the configuration parameter corresponding to the positioning QoS information according to the pre-stored association relationship among the positioning QoS information, the configuration parameter of the positioning reference signal and the threshold value corresponding to the configuration parameter includes:
determining positioning QoS information of a terminal device of the at least two terminal devices with a highest or lowest priority as target positioning QoS information; and
determining a value of a configuration parameter corresponding to the target positioning QoS information according to the pre-stored association relationship among the positioning QoS information, the configuration parameter of the positioning reference signal and the threshold value corresponding to the configuration parameter.

In the present scheme, the first network element can determine final target positioning QoS information according to respective priorities of the at least two terminal devices, and the corresponding initial positioning assistance data can be determined, to improve the accuracy of the initial positioning assistance data.

In yet another embodiment of the present application provides a method for positioning a terminal device, the method being applied to a first network device and including:
receiving a second message transmitted by a first network element, where the second message includes positioning QoS information of the terminal device or initial positioning assistance data corresponding to the positioning QoS information;
determining first target positioning assistance data according to the positioning QoS information or the initial positioning assistance data, where the first target positioning assistance data is associated with the positioning QoS information;
transmitting the first target positioning assistance data to the first network element and the terminal device respectively, where the first target positioning assistance data is used to be indicative of transmitting, by the first network element, the first target positioning assistance data to a second network device and receiving a second positioning measurement transmitted by the second network device, where the second positioning measurement is obtained upon measurement performed by the second network device on an uplink positioning reference signal after receiving the uplink positioning reference signal according to the first target positioning assistance data; and receiving, according to the first target positioning assistance data, an uplink positioning reference signal transmitted by the terminal device, and measuring the uplink positioning reference signal to obtain a first positioning measurement, and transmitting the first positioning measurement to the first network element.

In the present scheme, the first network device, when assigning the first target positioning assistance data to the terminal device, may consider positioning QoS information of each terminal device, and assign corresponding first target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

In a possible implementation, the second message includes positioning QoS information of the terminal device;
the determining the first target positioning assistance data according to the positioning QoS information includes:
determining a value of a configuration parameter corresponding to the positioning QoS information according to a pre-stored association relationship among the positioning QoS information, a configuration parameter of a positioning reference signal and a threshold value corresponding to the configuration parameter; and
determining the first target positioning assistance data according to the value of the configuration parameter.

In the present scheme, the first network device can determine the value of the configuration parameter corresponding to the positioning QoS information according to the pre-stored association relationship among the positioning QoS information, the configuration parameter of the positioning reference signal and the threshold value corresponding to the configuration parameter, and determine the first target positioning assistance data according to the value, and the first target positioning assistance data can be associated with the positioning QoS information of the terminal device, to avoid a phenomenon in the prior art that all terminal devices are uniformly assigned with positioning assistance data. Instead, the positioning QoS information of each terminal device is considered, and corresponding positioning assistance data is assigned to the terminal device, and not only the positioning precision and the positioning latency can be ensured for the terminal device, but also overheads for system resources and a waste of resources can be reduced.

In a possible implementation, the second message includes initial positioning assistance data corresponding to the positioning QoS information;
the determining the first target positioning assistance data according to the initial positioning assistance data includes:
adjusting the initial positioning assistance data to obtain the first target positioning assistance data; or
determining the initial positioning assistance data as the first target positioning assistance data.

In the present scheme, the first network device can directly determine the initial positioning assistance data determined by the first network element, as the first target positioning assistance data, and thus the efficiency of determining the first target positioning assistance data can be improved. In addition, the first network device can also adjust the initial positioning assistance data according to resource allocation and to obtain the first target positioning assistance data, and thus the utilization of resources can be improved.

In a possible implementation, the second message further includes an association relationship among the positioning QoS information, a configuration parameter of a positioning reference signal and a threshold value corresponding to the configuration parameter.

In the present scheme, since the first network element can transmit an association relationship among the positioning QoS information, a configuration parameter of a positioning reference signal and a threshold value corresponding to the configuration parameter to the first network device in advance, and the first network device will store the association relationship locally, and the first network device can directly determine initial positioning assistance data according to the association relationship after receiving the positioning QoS information transmitted by the first network element, and thus each time when determining the initial positioning assistance data, there is no need for the first network element to transmit the association relationship to the first network device, therefore, the efficiency of determining the initial positioning assistance data can be improved.

In a possible implementation, the second message further includes an updated threshold value corresponding to a configuration parameter, and the threshold value is updated by the first network element according to capability information of the terminal device.

In the present scheme, the first network element, after updating the threshold value corresponding to the configuration parameter according to the capability information of the terminal device, transmits the updated threshold value to the first network device, therefore, not only the flexibility of threshold value selection is improved for the configuration parameter, but also a different threshold value can be determined for each terminal device, to improve the accuracy of the determined positioning assistance data.

In yet another embodiment of the present application provides a method for positioning a terminal device, the method being applied to a first network device and including:
receiving a second message transmitted by a first network element, where the second message includes positioning QoS information of the terminal device or initial positioning assistance data corresponding to the positioning QoS information;
determining first target positioning assistance data according to the positioning QoS information or the initial positioning assistance data, where the first target positioning assistance data is associated with the positioning QoS information; and
transmitting the first target positioning assistance data to the first network element, where the first target positioning assistance data is used to be indicative of transmitting, by the first network element, the first target positioning assistance data to the terminal device and receiving a first positioning measurement and a second positioning measurement transmitted by the terminal device, and determining location information of the terminal device according to the first positioning measurement and the second positioning measurement; where the first positioning measurement is obtained by the terminal device by receiving, according to the first target positioning assistance data, a first downlink positioning reference signal transmitted by the first network device and measuring the first downlink positioning reference signal, the second positioning measurement is obtained by the terminal device by receiving, according to second target positioning assistance data, a second downlink positioning reference signal transmitted by a second network device and measuring the second downlink positioning reference signal, and the second target positioning assistance data is determined by the second network device.

In the present scheme, the first network device, when assigning the first target positioning assistance data to the terminal device, may consider positioning QoS information of each terminal device, and assign corresponding first target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

In a possible implementation, the second message includes positioning QoS information of the terminal device;
the determining the first target positioning assistance data according to the positioning QoS information includes:
determining a value of a configuration parameter corresponding to the positioning QoS information according to a pre-stored association relationship among the positioning QoS information, a configuration parameter of a positioning reference signal and a threshold value corresponding to the configuration parameter; and
determining the first target positioning assistance data according to the
value of the configuration parameter.

In the present scheme, the first network device can determine the value of the configuration parameter corresponding to the positioning QoS information according to the pre-stored association relationship among the positioning QoS information, the configuration parameter of the positioning reference signal and the threshold value corresponding to the configuration parameter, and determine the first target positioning assistance data according to the value, and the first target positioning assistance data can be associated with the positioning QoS information of the terminal device, to avoid a phenomenon in the prior art that all terminal devices are uniformly assigned with positioning assistance data. Instead, the positioning QoS information of each terminal device is considered, and corresponding positioning assistance data is assigned to the terminal device, and not only the positioning precision and the positioning latency can be ensured for the terminal device, but also overheads for system resources and a waste of resources can be reduced.

In a possible implementation, the second message includes initial positioning assistance data corresponding to the positioning QoS information;
the determining the first target positioning assistance data according to the initial positioning assistance data includes:
adjusting the initial positioning assistance data to obtain the first target positioning assistance data; or
determining the initial positioning assistance data as the first target positioning assistance data.

In the present scheme, the first network device can directly determine the initial positioning assistance data determined by the first network element, as the first target positioning assistance data, and thus the efficiency of determining the first target positioning assistance data can be improved. In addition, the first network device can also adjust the initial positioning assistance data according to resource allocation and to obtain the first target positioning assistance data, and thus the utilization of resources can be improved.

In a possible implementation, the second message further includes an association relationship among the positioning QoS information, a configuration parameter of a positioning reference signal and a threshold value corresponding to the configuration parameter.

In the present scheme, since the first network element can transmit an association relationship among the positioning QoS information, a configuration parameter of a positioning reference signal and a threshold value corresponding to the configuration parameter to the first network device in advance, and the first network device will store the association relationship locally, and the first network device can directly determine initial positioning assistance data according to the association relationship after receiving the positioning QoS information transmitted by the first network element, and thus each time when determining the initial positioning assistance data, there is no need for the first network element to transmit the association relationship to the first network device, therefore, the efficiency of determining the initial positioning assistance data can be improved.

In a possible implementation, the second message further includes an updated threshold value corresponding to a configuration parameter, and the threshold value is updated by the first network element according to capability information of the terminal device.

In the present scheme, the first network element, after updating the threshold value corresponding to the configuration parameter according to the capability information of the terminal device, transmits the updated threshold value to the first network device, therefore, not only the flexibility of threshold value selection is improved for the configuration parameter, but also a different threshold value can be determined for each terminal device, to improve the accuracy of the determined positioning assistance data.

In yet another embodiment of the present provides an apparatus for positioning a terminal device, including a memory, a transceiver and a processor:
where the memory is configured to store a computer program; the transceiver is configured to transceive data under control of the processor; and the processor is configured to read the computer program in the memory and execute operations of:
receiving a first message from the terminal device, where the first message
transmitting a second message to a first network device, where the second message includes the positioning QoS information or initial positioning assistance data corresponding to the positioning QoS information;
receiving first target positioning assistance data transmitted by the first network device, and transmitting the first target positioning assistance data to a second network device, where the first target positioning assistance data is associated with the positioning QoS information;
receiving a first positioning measurement from the first network device and a second positioning measurement from the second network device, where the first positioning measurement is obtained upon measurement performed by the first network device on an uplink positioning reference signal after receiving the uplink positioning reference signal according to the first target positioning assistance data, and the second positioning measurement is obtained upon measurement performed by the second network device on the uplink positioning reference signal after receiving the uplink positioning reference signal according to the first target positioning assistance data; and determining location information of the terminal device according to the first positioning measurement and the second positioning measurement.

In a possible implementation, the second message includes initial positioning assistance data corresponding to the positioning QoS information;

the processor is configured to:

determine a value of a configuration parameter corresponding to the positioning QoS information according to a pre-stored association relationship among the positioning QoS information, a configuration parameter of a positioning reference signal and a threshold value corresponding to the configuration parameter; and determine the value of the configuration parameter as the initial positioning assistance data.

In a possible implementation, the first message further includes capability information of the terminal device;

the processor is configured to:

update the threshold value corresponding to the configuration parameter according to the capability information of the terminal device.

In a possible implementation, the second message further includes an association relationship among the positioning QoS information, a configuration parameter of a positioning reference signal and a threshold value corresponding to the configuration parameter.

In a possible implementation, the second message further includes the updated threshold value corresponding to the configuration parameter.

In a possible implementation, the terminal device is at least two in number;

the processor is configured to:

acquire a priority of each terminal device of at least two terminal devices;

determine positioning QoS information of a terminal device of the at least two terminal devices with a highest or lowest priority as target positioning QoS information; and determine a value of a configuration parameter corresponding to the target positioning QoS information according to the pre-stored association relationship among the positioning QoS information, the configuration parameter of the positioning reference signal and the threshold value corresponding to the configuration parameter.

In yet another embodiment of the present application provides an apparatus for positioning a terminal device, including a memory, a transceiver and a processor:

where the memory is configured to store a computer program; the transceiver is configured to transceive data under control of the processor; and the processor is configured to read the computer program in the memory and execute operations of:

receiving a first message from the terminal device, where the first message includes positioning quality of service QoS information;

transmitting a second message to a first network device and a second network device respectively, where the second message includes the positioning QoS information or initial positioning assistance data corresponding to the positioning QoS information;

receiving first target positioning assistance data transmitted by the first network device and second target positioning assistance data transmitted by the second network device, respectively, where both the first target positioning assistance data and the second target positioning assistance data are associated with the positioning QoS information;

transmitting the first target positioning assistance data and the second target positioning assistance data to the terminal device;

receiving a first positioning measurement and a second positioning measurement transmitted by the terminal device, where the first positioning measurement is obtained by the terminal device by receiving, according to the first target positioning assistance data, a first downlink positioning reference signal transmitted by the first network device and measuring the first downlink positioning reference signal, and the second positioning measurement is obtained by the terminal device by receiving, according to the second target positioning assistance data, a second downlink positioning reference signal transmitted by the second network device and measuring the second downlink positioning reference signal; and determining location information of the terminal device according to the first positioning measurement and the second positioning measurement.

In a possible implementation, the second message includes initial positioning assistance data corresponding to the positioning QoS information;

the processor is configured to:

determine a value of a configuration parameter corresponding to the positioning QoS information according to a pre-stored association relationship among the positioning QoS information, a configuration parameter of a positioning reference signal and a threshold value corresponding to the configuration parameter; and determine the value of the configuration parameter as the initial positioning assistance data.

In a possible implementation, the first message further includes capability information of the terminal device;

the processor is configured to:

update the threshold value corresponding to the configuration parameter according to the capability information of the terminal device.

In a possible implementation, the second message further includes an association relationship among the positioning QoS information, a configuration parameter of a positioning reference signal and a threshold value corresponding to the configuration parameter.

In a possible implementation, the second message further includes the updated threshold value corresponding to the configuration parameter.

In a possible implementation, the terminal device is at least two in number;

the processor is configured to:

acquire a priority of each terminal device of at least two terminal devices;

determine positioning QoS information of a terminal device of the at least two terminal devices with a highest or lowest priority as target positioning QoS information; and determine a value of a configuration parameter corresponding to the target positioning QoS information according to the pre-stored association relationship among the positioning QoS information, the configuration parameter of the positioning reference signal and the threshold value corresponding to the configuration parameter.

In yet another embodiment of the present application provides an apparatus for positioning a terminal device, including a memory, a transceiver and a processor:

where the memory is configured to store a computer program; the transceiver is configured to transceive data under control of the processor; and the processor is configured to read the computer program in the memory and execute operations of:

receiving a second message transmitted by a first network element, where the second message includes positioning QoS information of the terminal device or initial positioning assistance data corresponding to the positioning QoS information;

determining first target positioning assistance data according to the positioning QoS information or the initial positioning assistance data, where the first target positioning assistance data is associated with the positioning QoS information;

transmitting the first target positioning assistance data to the first network element and the terminal device respectively, where the first target positioning assistance data is used to be indicative of transmitting, by the first network element, the first target positioning assistance data to a second network device and receiving a second positioning measurement transmitted by the second network device, where the second positioning measurement is obtained upon measurement performed by the second network device on an uplink positioning reference signal after receiving the uplink positioning reference signal according to the first target positioning assistance data; and receiving, according to the first target positioning assistance data, an uplink positioning reference signal transmitted by the terminal device, and measuring the uplink positioning reference signal to obtain a first positioning measurement, and transmitting the first positioning measurement to the first network element.

In a possible implementation, the second message includes positioning QoS information of the terminal device; the processor is configured to:

determine a value of a configuration parameter corresponding to the positioning QoS information according to a pre-stored association relationship among the positioning QoS information, a configuration parameter of a positioning reference signal and a threshold value corresponding to the configuration parameter; and determine the first target positioning assistance data according to the value of the configuration parameter.

In a possible implementation, the second message includes initial positioning assistance data corresponding to the positioning QoS information;

the processor is configured to:

adjust the initial positioning assistance data to obtain the first target positioning assistance data; or determine the initial positioning assistance data as the first target positioning assistance data.

In a possible implementation, the second message further includes an association relationship among the positioning QoS information, a configuration parameter of a positioning reference signal and a threshold value corresponding to the configuration parameter.

In a possible implementation, the second message further includes an updated threshold value corresponding to a configuration parameter, and the threshold value is updated by the first network element according to capability information of the terminal device.

In yet another embodiment of the present application provides an apparatus for positioning a terminal device, including a memory, a transceiver and a processor:

where the memory is configured to store a computer program; the transceiver is configured to transceive data under control of the processor; and the processor is configured to read the computer program in the memory and execute operations of:

receiving a second message transmitted by a first network element, where the second message includes positioning QoS information of the terminal device or initial positioning assistance data corresponding to the positioning QoS information;

determining first target positioning assistance data according to the positioning QoS information or the initial positioning assistance data, where the first target positioning assistance data is associated with the positioning QoS information; and transmitting the first target positioning assistance data to the first network element, where the first target positioning assistance data is used to be indicative of transmitting, by the first network element, the first target positioning assistance data to the terminal device and receiving a first positioning measurement and a second positioning measurement transmitted by the terminal device, and determining location information of the terminal device according to the first positioning measurement and the second positioning measurement; where the first positioning measurement is obtained by the terminal device by receiving, according to the first target positioning assistance data, a first downlink positioning reference signal transmitted by the first network device and measuring the first downlink positioning reference signal, the second positioning measurement is obtained by the terminal device by receiving, according to second target positioning assistance data, a second downlink positioning reference signal transmitted by a second network device and measuring the second downlink positioning reference signal, and the second target positioning assistance data is determined by the second network device.

In a possible implementation, the second message includes positioning QoS information of the terminal device; the processor is configured to:

determine a value of a configuration parameter corresponding to the positioning QoS information according to a pre-stored association relationship among the positioning QoS information, a configuration parameter of a positioning reference signal and a threshold value corresponding to the configuration parameter; and determine the first target positioning assistance data according to the value of the configuration parameter.

In a possible implementation, the second message includes initial positioning assistance data corresponding to the positioning QoS information;

the processor is configured to:

adjust the initial positioning assistance data to obtain the first target positioning assistance data; or determine the initial positioning assistance data as the first target positioning assistance data.

In a possible implementation, the second message further includes an association relationship among the positioning QoS information, a configuration parameter of a positioning reference signal and a threshold value corresponding to the configuration parameter.

In a possible implementation, the second message further includes an updated threshold value corresponding to a configuration parameter, and the threshold value is updated by the first network element according to capability information of the terminal device.

In yet another embodiment of the present application provides an apparatus for positioning a terminal device, including:
- a receiving device, configured to receive a first message from the terminal device, where the first message includes positioning quality of service QoS information;
- a transmitting device, configured to transmit a second message to a first network device, where the second message includes the positioning QoS information or initial positioning assistance data corresponding to the positioning QoS information;
- where the receiving device is further configured to receive first target positioning assistance data transmitted by the first network device;
- where the transmitting device is further configured to transmit the first target positioning assistance data to a second network device, the first target positioning assistance data is associated with the positioning QoS information; and
- where the receiving device is further configured to receive a first positioning measurement from the first network device and a second positioning measurement from the second network device, the first positioning measurement is obtained upon measurement performed by the first network device on an uplink positioning reference signal after receiving the uplink positioning reference signal according to the first target positioning assistance data, and the second positioning measurement is obtained upon measurement performed by the second network device on the uplink positioning reference signal after receiving the uplink positioning reference signal according to the first target positioning assistance data; and
- a processing device, configured to determine location information of the terminal device according to the first positioning measurement and the second positioning measurement.

In a possible implementation, the second message includes initial positioning assistance data corresponding to the positioning QoS information;
the processing device is configured to:
determine a value of a configuration parameter corresponding to the positioning QoS information according to a pre-stored association relationship among the positioning QoS information, a configuration parameter of a positioning reference signal and a threshold value corresponding to the configuration parameter; and
determine the value of the configuration parameter as the initial positioning assistance data.

In a possible implementation, the first message further includes capability information of the terminal device;

the processing device is configured to update the threshold value corresponding to the configuration parameter according to the capability information of the terminal device.

In a possible implementation, the second message further includes an association relationship among the positioning QoS information, a configuration parameter of a positioning reference signal and a threshold value corresponding to the configuration parameter.

In a possible implementation, the second message further includes the updated threshold value corresponding to the configuration parameter.

In a possible implementation, the terminal device is at least two in number;
the processing device is configured to:
acquire a priority of each terminal device of at least two terminal devices;
determine positioning QoS information of a terminal device of the at least two terminal devices with a highest or lowest priority as target positioning QoS information; and
determine a value of a configuration parameter corresponding to the target positioning QoS information according to the pre-stored association relationship among the positioning QoS information, the configuration parameter of the positioning reference signal and the threshold value corresponding to the configuration parameter.

In yet another embodiment of the present application provides an apparatus for positioning a terminal device, including:
- a receiving device, configured to receive a first message from the terminal device, where the first message includes positioning quality of service QoS information;
- a transmitting device, configured to transmit a second message to a first network device and a second network device respectively, where the second message includes the positioning QoS information or initial positioning assistance data corresponding to the positioning QoS information;
- where the receiving device is further configured to receive first target positioning assistance data transmitted by the first network device and second target positioning assistance data transmitted by the second network device, respectively; both the first target positioning assistance data and the second target positioning assistance data are associated with the positioning QoS information;
- where the transmitting device is further configured to transmit the first target positioning assistance data and the second target positioning assistance data to the terminal device;
- where the receiving device is further configured to receive a first positioning measurement and a second positioning measurement transmitted by the terminal device, the first positioning measurement is obtained by the terminal device by receiving, according to the first target positioning assistance data, a first downlink positioning reference signal transmitted by the first network device and measuring the first downlink positioning reference signal, and the second positioning measurement is obtained by the terminal device by receiving, according to the second target positioning assistance data, a second downlink positioning reference signal transmitted by the second network device and measuring the second downlink positioning reference signal; and a processing device, configured to determine location information of the terminal device according to the first positioning measurement and the second positioning measurement.

In a possible implementation, the second message includes initial positioning assistance data corresponding to the positioning QoS information;

the processing device is configured to:

determine a value of a configuration parameter corresponding to the positioning QoS information according to a pre-stored association relationship among the positioning QoS information, a configuration parameter of a positioning reference signal and a threshold value corresponding to the configuration parameter; and determine the value of the configuration parameter as the initial positioning assistance data.

In a possible implementation, the first message further includes capability information of the terminal device;

the processing device is configured to update the threshold value corresponding to the configuration parameter according to the capability information of the terminal device.

In a possible implementation, the second message further includes an association relationship among the positioning QoS information, a configuration parameter of a positioning reference signal and a threshold value corresponding to the configuration parameter.

In a possible implementation, the second message further includes the updated threshold value corresponding to the configuration parameter.

In a possible implementation, the terminal device is at least two in number;

the processing device is configured to:

acquire a priority of each terminal device of at least two terminal devices;

determine positioning QoS information of a terminal device of the at least two terminal devices with a highest or lowest priority as target positioning QoS information; and determine a value of a configuration parameter corresponding to the target positioning QoS information according to the pre-stored association relationship among the positioning QoS information, the configuration parameter of the positioning reference signal and the threshold value corresponding to the configuration parameter.

In yet another embodiment of the present application provides an apparatus for positioning a terminal device, including:

a receiving device, configured to receive a second message transmitted by a first network element, where the second message includes positioning QoS information of the terminal device or initial positioning assistance data corresponding to the positioning QoS information;

a processing device, configured to determine first target positioning assistance data according to the positioning QoS information or the initial positioning assistance data, where the first target positioning assistance data is associated with the positioning QoS information; and a transmitting device, configured to transmit the first target positioning assistance data to the first network element and the terminal device respectively, where the first target positioning assistance data is used to be indicative of transmitting, by the first network element, the first target positioning assistance data to a second network device and receiving a second positioning measurement transmitted by the second network device, where the second positioning measurement is obtained upon measurement performed by the second network device on an uplink positioning reference signal after receiving the uplink positioning reference signal according to the first target positioning assistance data;

where the receiving device is further configured to receive, according to the first target positioning assistance data, an uplink positioning reference signal transmitted by the terminal device, and measure the uplink positioning reference signal to obtain a first positioning measurement; and where the transmitting device is further configured to transmit the first positioning measurement to the first network element.

In a possible implementation, the second message includes positioning QoS information of the terminal device;

the processing device is configured to:

determine a value of a configuration parameter corresponding to the positioning QoS information according to a pre-stored association relationship among the positioning QoS information, a configuration parameter of a positioning reference signal and a threshold value corresponding to the configuration parameter; and determine the first target positioning assistance data according to the value of the configuration parameter.

In a possible implementation, the second message includes initial positioning assistance data corresponding to the positioning QoS information;

the processing device is configured to:

adjust the initial positioning assistance data to obtain the first target positioning assistance data; or determine the initial positioning assistance data as the first target positioning assistance data.

In a possible implementation, the second message further includes an association relationship among the positioning QoS information, a configuration parameter of a positioning reference signal and a threshold value corresponding to the configuration parameter.

In a possible implementation, the second message further includes an updated threshold value corresponding to a configuration parameter, and the threshold value is updated by the first network element according to capability information of the terminal device.

In yet another embodiment of the present application provides an apparatus for positioning a terminal device, including:

a receiving device, configured to receive a second message transmitted by a first network element, where the second message includes positioning QoS information of the terminal device or initial positioning assistance data corresponding to the positioning QoS information;

a processing device, configured to determine first target positioning assistance data according to the positioning QoS information or the initial positioning assistance data, where the first target positioning assistance data is associated with the positioning QoS information; and a transmitting device, configured to transmit the first target positioning assistance data to the first network element, where the first target positioning assistance data is used to be indicative of transmitting, by the first network element, the first target positioning assistance data to the terminal device and receiving a first positioning measurement and a second positioning measurement transmitted by the terminal device, and determining location information of the terminal device according to the first positioning measurement and the second positioning measurement; where the first positioning measurement is obtained by the terminal device by receiving, according to the first target positioning assistance data, a first downlink positioning reference signal transmitted by the first network device and measuring the first downlink positioning reference signal, the second positioning measurement is obtained by the terminal device by receiving, according to second target positioning assistance data, a second downlink positioning reference signal transmitted by a second network device and measuring the second downlink positioning reference signal, and the second target positioning assistance data is determined by the second network device.

In a possible implementation, the second message includes positioning QoS information of the terminal device;
the processing device is configured to:
determine a value of a configuration parameter corresponding to the positioning QoS information according to a pre-stored association relationship among the positioning QoS information, a configuration parameter of a positioning reference signal and a threshold value corresponding to the configuration parameter; and
determine the first target positioning assistance data according to the value of the configuration parameter.

In a possible implementation, the second message includes initial positioning assistance data corresponding to the positioning QoS information;
the processing device is configured to:
adjust the initial positioning assistance data to obtain the first target positioning assistance data; or
determine the initial positioning assistance data as the first target positioning assistance data.

In a possible implementation, the second message further includes an association relationship among the positioning QoS information, a configuration parameter of a positioning reference signal and a threshold value corresponding to the configuration parameter.

In a possible implementation, the second message further includes an updated threshold value corresponding to a configuration parameter, and the threshold value is updated by the first network element according to capability information of the terminal device.

In yet another embodiment of the present application provides a processor-readable storage medium in which a computer program is stored, where the computer program is configured to enable a processor to execute the method for positioning a terminal device according to any one of the foregoing possible implementations.

In yet another embodiment of the present application provides a computer program product including a computer program, where the computer program, when being executed by a processor, implements the method for positioning a terminal device according to any one of the foregoing possible implementations.

The present application provides a method and an apparatus for positioning a terminal device and provides a storage medium, where a first message received by a first network element from a terminal device includes positioning QoS information, the first network element can determine initial positioning assistance data according to the positioning QoS information and transmit the initial positioning assistance data to a first network device, or the first network element can directly transmit the positioning QoS information to the first network device, and the first network device determines first target positioning assistance data according to the initial positioning assistance data or the positioning QoS information, and thus the first network element is enabled to acquire a positioning measurement corresponding to the first target positioning assistance data and to determine location information of the terminal device. The first network device, when assigning the first target positioning assistance data to the terminal device, may consider positioning QoS information of each terminal device, and assign corresponding first target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

It will be appreciated that the content described in the above summary part is not intended to limit key or important features of embodiments of the present application, nor to limit the scope of the present application. Other features of the present application will become readily comprehensible from the following description.

BRIEF DESCRIPTION OF DRAWINGS

In order to illustrate the embodiments of the present application more clearly, the accompanying drawings used in the description of the embodiments will be briefly described hereunder. Apparently, the drawings in the following description are merely intended for some embodiments of present application.

FIG. 6A to FIG. 6C are signaling flow diagrams of determining positioning information of a terminal device with a downlink positioning method according to the present application.

FIG. 8 is a schematic diagram of a first network element according to an embodiment of the present application.

FIG. 9 is a schematic diagram of a network device according to an embodiment of the present application.

FIG. 10 is a schematic diagram of an apparatus for positioning a terminal device according to an embodiment of the present application.

FIG. 11 is a schematic diagram of another apparatus for positioning a terminal device according to an embodiment of the present application.

FIG. 12 is a schematic diagram of yet another apparatus for positioning a terminal device according to an embodiment of the present application.

FIG. 13 is a schematic diagram of yet another apparatus for positioning a terminal device according to an embodiment of the present application.

DESCRIPTION OF EMBODIMENTS

The term "and/or" in the present application is intended to describe an association relationship between associated objects, indicating that there can be three relationships, for example, A and/or B may represent the following cases: A exists alone, both A and B exist, and B exists alone. The character "/" generally indicates that contextually associated objects are in an "or" relationship.

In the embodiments of the present application, the term "a plurality of" refers to two or more, and other quantifiers have the similar meaning thereto.

The embodiments of the present application will be clearly and comprehensively described hereunder in conjunction with the accompanying drawings of the embodiments of the present application. Apparently, the described embodiments are merely a part of the embodiments of the present application, rather than all embodiments of the present application.

The method and the apparatus for positioning a terminal device, and the storage medium according to the embodiments of the present application are used in any application scenario where the position of a terminal device needs to be determined, for example, navigation, ranging, positioning a caller based on an emergency call, or positioning, based on a user request, other user that has been authorized, etc.

The embodiments of the present application is applicable to various systems, especially a 5G system. For example, the applicable system may be a global system of mobile communication (global system of mobile communication, GSM), a code division multiple access (code division multiple access, CDMA) system, wideband code division multiple access (Wideband Code Division Multiple Access, WCDMA), a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a long term evolution advanced (long term evolution advanced, LTE-A) system, a universal mobile telecommunication system (universal mobile telecommunication system, UMTS), a worldwide interoperability for microwave access (worldwide interoperability for microwave access, WiMAX) system, a 5G new radio (New Radio, NR) system or the like. Each of the various systems includes a terminal device and a network device. The system may further include a core network part, such as an evolved packet system (Evolved Packet System, EPS), a 5G system (5GS) and the like.

Figure 1:
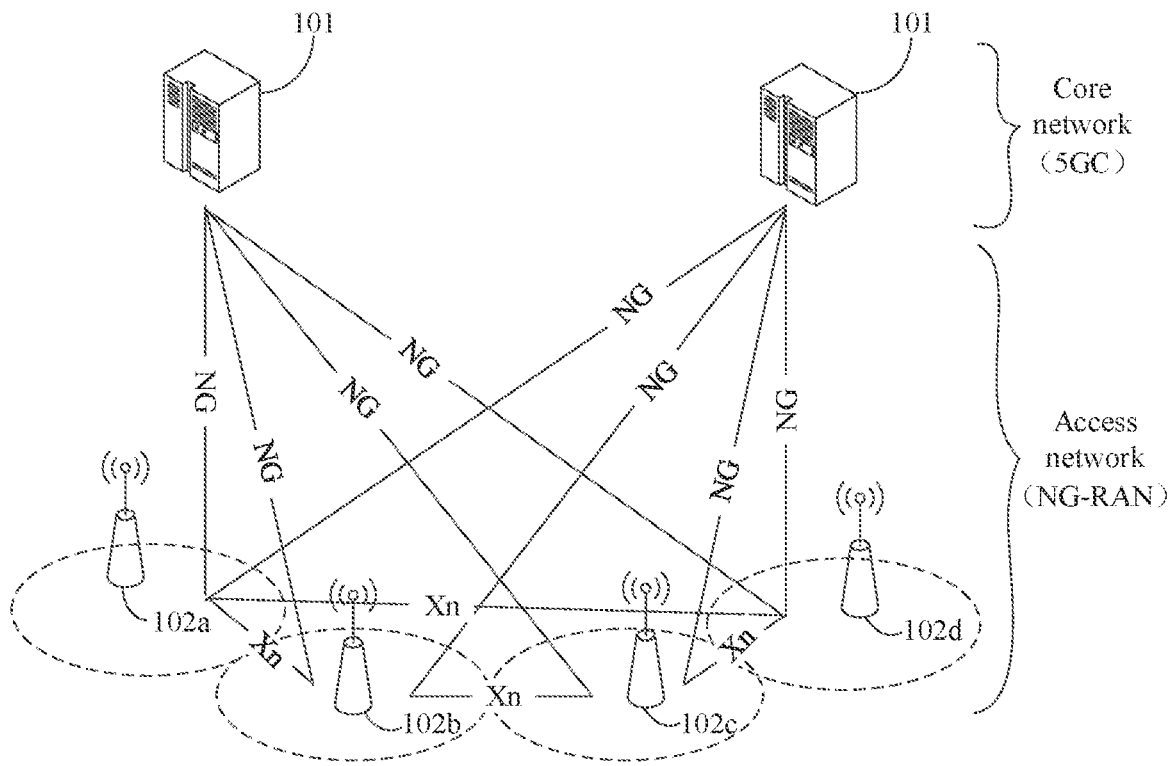
FIG. 1 is a schematic structural diagram of a 5G communication system applicable to an embodiment of the present application.

FIG. 1 is a schematic structural diagram of a 5G communication system applicable to an embodiment of the present application. As shown in FIG. 1, the 5G communication system is composed of 5G core network (5G Core Network, 5GC) network elements 101 and next generation radio access network (Next Generation Radio Access Network, NG-RAN) network elements 102, where the 5GC network elements 101 and the NG-RAN network elements 102 are connected through NG interfaces.

The 5GC network elements 101 include an access and mobility management function (Access and Mobility Management Function, AMF) for supporting access and mobility management and other control plane functions, a core network location management function (Core Network Location Management Function, CN LMF) for providing a location service, and a user plane function (User Plane Function, UPF), etc. (not shown in the figure).

The NG-RAN network elements 102 include RAN nodes (102a~102d as shown in the figure). The RAN nodes include network devices, such as gNBs providing user plane and control plane protocols and functions of a wireless network for the 5G network, or ng-eNBs providing user plane and control plane protocols and functions of a wireless network for 4G network users. On the access network side, an Xn interface is connected between a gNB and an ng-eNB, and between a gNB and a gNB, that is, the RAN nodes in the access network are connected through Xn interfaces. It should be noted that an AMF entity is briefly as an AMF and an LMF entity is briefly as an LMF, in the following description.

The RAN nodes include a serving base station of a terminal device and a neighboring station of the terminal device. For example, if the terminal device is in a cell within coverage of a gNB 102a, the gNB 102a is a serving base station of the terminal device and a gNB 102b is a neighboring station of the terminal device.

It should be noted that the above architecture is described by taking the 5G system architecture as an example. Embodiments of the present application are also applicable to a 5G evolution system or other communication systems (for example, a 4G communication system), or to a system architecture of hybrid networking of a 5G system and other communication systems (for example, a 4G system), etc., and no more enumeration will be made here. For example, in a 4G communication system, or in a hybrid networking system of a 4G communication system and a 5G communication system, mobile management can be achieved by a mobility management entity (Mobility Management Entity, MME).

Based on the above-described system structure, the CN LMF in the core network, with the cooperation of core network elements such as the AMF or the MME, provides a positioning service for the terminal device through the RAN nodes.

Figure 2:
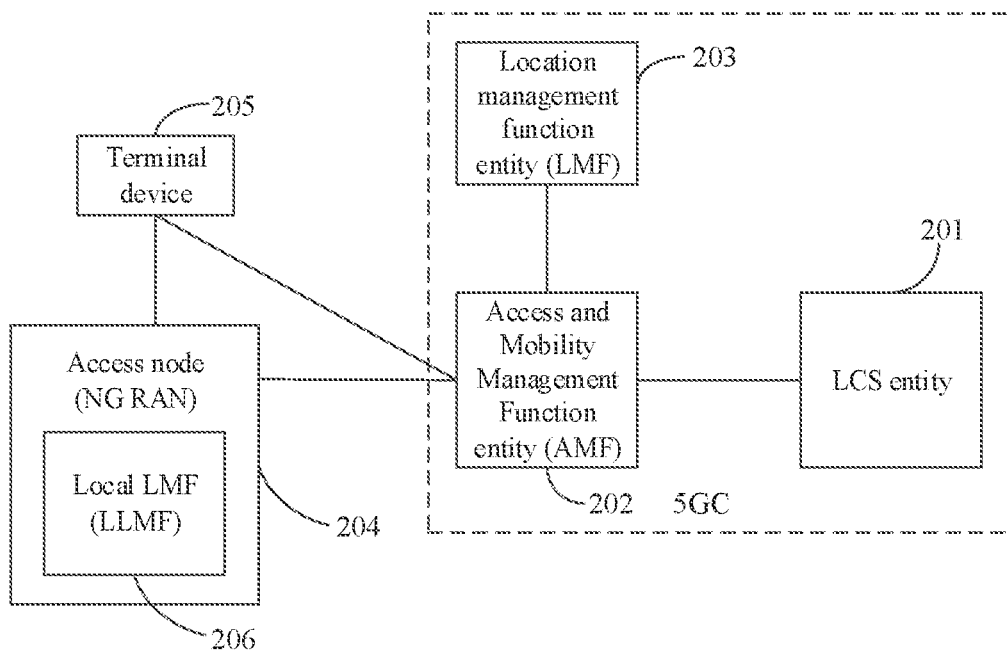
FIG. 2 is a schematic structural diagram of a location service network in a 5G network applicable to an embodiment of the present application.

FIG. 2 is a schematic structural diagram of a location service network in a 5G network applicable to an embodiment of the present application. Some network elements related to the embodiment of the present application are enumerated exemplarily in the figure. As shown in FIG. 2, LMFs include a core network LMF (such as an LMF 203 in the figure), and also include a local LMF (Local LMF, LLMF) provided on the access network side. There is an association between a local LMF and a RAN node, for example, one local LMF may correspond to one or more RAN nodes. The local LMF can be collocated with the RAN node(s), and the local LMF is associated with the RAN node(s) with which it is collocated (for example, the local LMF (Local LMF, LLMF) 206 is collocated with the RAN node 204 in the figure).

Based on the aforementioned system architecture, the positioning service process of the terminal device may include: an LCS entity 201 initiating a positioning service request to an AMF 202; the AMF 202 selects, according to network configuration and information related to a terminal device 205, an LMF that provides a positioning service for the terminal device 205. If the AMF 202 selects the LMF 203 to provide a positioning service for the terminal device 205, a positioning service request is initiated to the LMF 203; if the AMF selects the LLMF 206 that is co-located with the RAN node (that is, a serving RAN node) 204 where the terminal device 205 resides to provide a positioning service for the terminal device 205, a positioning service request is initiated to the LLMF 206 co-located with the RAN node 204; the LMF 203 or the LLMF 206 obtains the location information of the terminal device 205 by interacting with the AMF 202, the RAN node 204 and the terminal device 205, and transmits a positioning service response message to the LCS entity 201 through the AMF 202. In this way, the location information of the terminal device can be determined.

The terminal device involved in the embodiments of the present application may refer to a device providing voice and/or data connectivity to a user, a handheld device with a wireless connection function, or other processing device connected to a wireless modem. In different systems, terminal devices may vary in terms of their names. For example, in the 5G system, the terminal device may be termed as user equipment (User Equipment, UE), and a wireless terminal device can communicate with one or more core networks (Core Network, CN) via a radio access network (Radio Access Network, RAN). The wireless terminal device may be a mobile terminal device such as a mobile phone (or termed as a "cellular" phone) and a computer having the mobile terminal device, and it may be, for example, a portable, pocket, handheld, computer built-in or vehicle-mounted mobile device exchanging language and/or data with the radio access network, for example, a personal communication service (Personal Communication Service, PCS) phone, a cordless phone, a session initiation protocol (Session Initiated Protocol, SIP) phone, a wireless local loop (Wireless Local Loop, WLL) station, a personal digital assistant (Personal Digital Assistant, PDA) or other device. The wireless terminal device may also be termed as a system, a subscriber unit (subscriber unit), a subscriber station (subscriber station), a mobile station (mobile station), a mobile platform (mobile), a remote station (remote station), an access point (access point), a remote terminal device (remote terminal), an access terminal device (access terminal), a user terminal device (user terminal), a user agent (user agent), or a user device (user device), which is not limited in the embodiments of the present application.

The network device involved in the embodiments of the present application may be a base station, where the base station may include cells providing services for a terminal. Depending on a specific application scenario, the base station may also be termed as an access point, or may be a device that communicates with a wireless terminal device through one or more sectors over an air interface in an access network, or may have another name. The network device can be configured to make a mutual replacement between a received air frame and an Internet Protocol (Internet Protocol, IP) packet, and act as a router between the wireless terminal device and the rest of the access network, where the rest of the access network may include an Internet Protocol (IP) communication network. The network device can also coordinate air interfaces in terms of property management. For example, the network device involved in the embodiments of the present application may be a network device (Base Transceiver Station, BTS) in the global system for mobile communications (Global System for Mobile communications, GSM) or the code division multiple access (Code Division Multiple Access, CDMA), or may be a network device (NodeB) in the Wide-band code division multiple access (Wide-band Code Division Multiple Access, WCDMA), or may be an evolutional network device (evolutional Node B, eNB or e-NodeB) in the long term evolution (long term evolution, LTE) system or a 5G base station (gNB) in the 5G network architecture (next generation system), or may be a home evolved base station (Home evolved Node B, HeNB), a relay node (relay node), a femto (femto), a pico (pico), etc., which is not limited in the embodiments of the present application. In some network structures, the network device may include a centralized unit (centralized unit, CU) node and a distributed unit (distributed unit, DU) node, where the centralized unit and the distributed unit can also be separated geographically.

The network device and the terminal device can each use one or more antennas for multi input multi output (Multi Input Multi Output, MIMO) transmission, and the MIMO transmission may be single user MIMO (Single User MIMO, SU-MIMO) or multi-user MIMO (Multi-User MIMO, MU-MIMO). Depending on the morphology and the number of antenna combinations, the MIMO transmission may be 2D-MIMO, 3D-MIMO, FD-MIMO or massive-MIMO, or may be diversity transmission or precoding transmission or beamforming transmission.

The LMF involved in the embodiments of the present application can be used to achieve position estimation of a terminal device. The LMF can be deployed within a core network, that is, the LMF is also a core network element. The LMF can communicate with an access network device such as an access node NG RAN through the AMF. For ease of description, in the embodiments of the present application, the LMF transmitting information to the access network device through the AMF is briefly as the LMF transmitting information to the access network device. In other words, the so-called LMF in the embodiments of the present application transmitting a message to the access network device can be interpreted as: the LMF first transmitting information to the AMF, and the AMF then forwarding the information to the access network device.

In addition, the LMF can also communicate with a terminal device. For example, the LMF can communicate with a terminal device through an LTE positioning protocol (LTE positioning protocol, LPP).

At present, in a 5G new radio (new radio, NR) protocol, when determining location information of a terminal device, a positioning method used in positioning the terminal device is generally determined by the LMF, but a positioning reference signal, positioning assistance data and a measurement reporting mechanism involved in this positioning method are assigned by a serving base station to the terminal device. When the serving base station is about to assign a positioning reference signal and corresponding positioning assistance data to the terminal device, in order to ensure the positioning precision and latency for all terminal devices, the positioning assistance data will be assigned to all the terminal devices according to relevant parameters of a terminal device with the worst communication performance, for example, assigning positioning reference signal (positioning reference signal, PRS)/sounding reference signal (sounding reference signal, SRS) resources, which would increase overheads for system resources and incur a waste of resources.

With considerations of the aforementioned problem, a method for positioning a terminal device is proposed in an embodiment of the present application. In the method, an association relationship among positioning quality of service (Quality of Service, QoS) information, a configuration parameter of a positioning reference signal and a threshold value corresponding to the configuration parameter can be established beforehand in a protocol-predefined or preconfigured manner, and a first network element or a serving base station will determine initial positioning assistance data corresponding to the positioning QoS information according to the association relationship, and the serving base station and/or a neighboring base station, when assigning target positioning assistance data to the terminal device, may consider positioning QoS information of each terminal device, and assign corresponding target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

The method and the apparatus are based on the same application conception. Since the problem is solved with similar principles according to the method and the apparatus, cross reference can be made to apparatus and method embodiments, and repetitions will be omitted.

The embodiments of the present application will be explained hereunder in terms of an uplink positioning method, a downlink positioning method, and an uplink+ downlink positioning method respectively.

Figure 3:
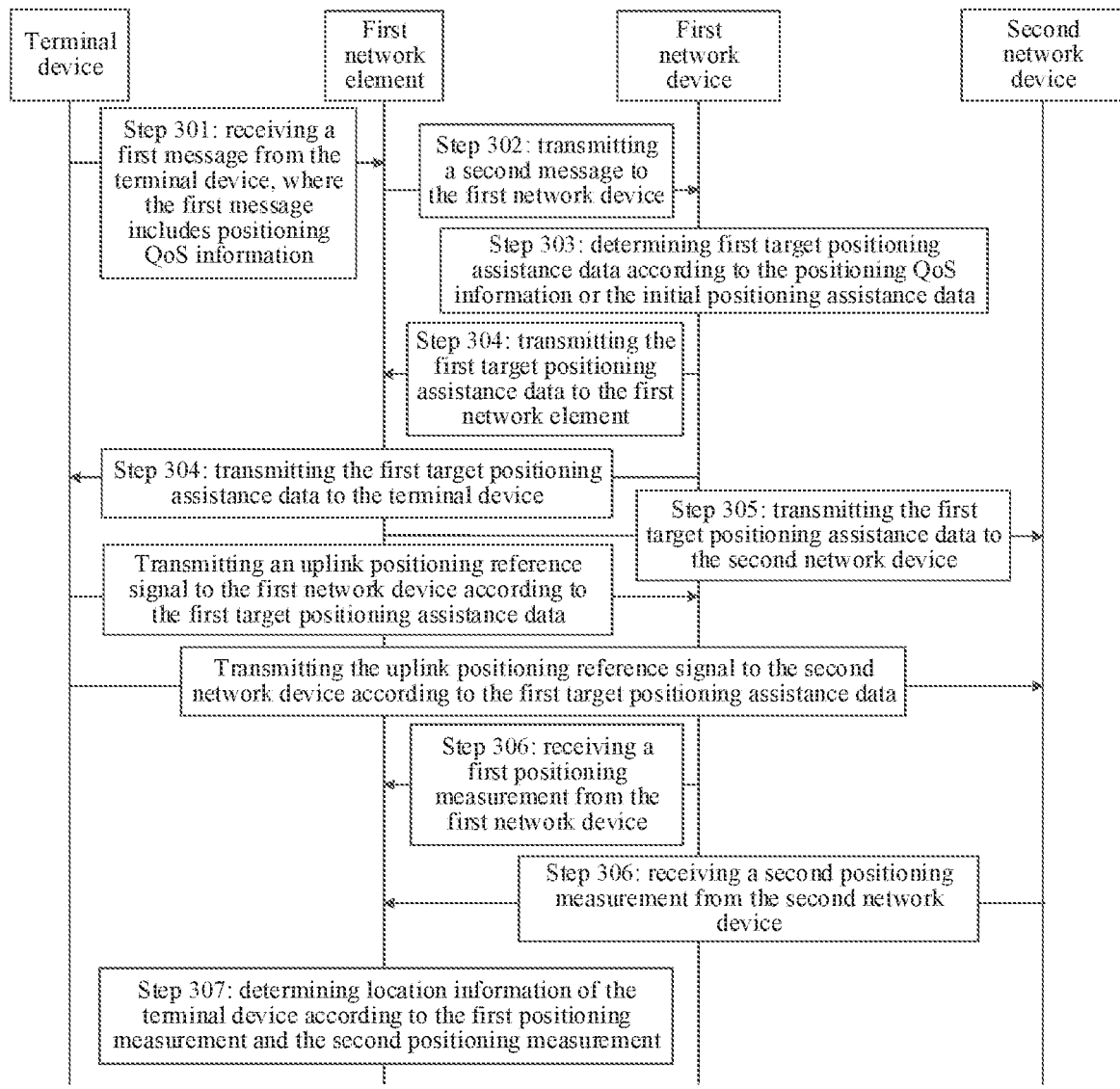
FIG. 3 is a signaling flow diagram of a method for positioning a terminal device according to an embodiment of the present application.

FIG. 3 is a signaling flow diagram of a method for positioning a terminal device according to an embodiment of the present application. In the present embodiment, detailed descriptions will be made to the scheme where the LMF determines location information of a terminal device with an uplink positioning method. As shown in FIG. 3, the method includes the following steps.

Step 301: a first network element receives a first message from a terminal device, where the first message includes positioning QoS information.

In this step, the first network element is the LMF shown in FIG. 2, which can be either the LMF 203 or the LLMF 206. The first message transmitted by the terminal device to the first network element carries positioning QoS information, where the positioning QoS information includes at least one of the following information: positioning precision, positioning latency, a scenario where the terminal device is applied, for example, applied in a high-speed scenario or a low-speed scenario, or a priority of the terminal device, etc.

Step 302: the first network element transmits a second message to a first network device, where the second message includes the positioning QoS information or initial positioning assistance data corresponding to the positioning QoS information.

The first network device includes a serving base station of the terminal device. Exemplarily, when transmission receipt points (Transmission Receipt Point, TRP) participating in transmission or reception of On demand (On demand) PRS/SRSs belong to a same serving base station, the serving base station determines a time frequency resource configuration parameter for the On demand (On demand) PRS/SRSs, that is, determining target positioning assistance data. When the TRPs participating in transmission or reception of the On demand PRS/SRSs belong to a serving base station and a neighboring base station, the serving base station and the neighboring base station respectively determine a time-frequency resource configuration parameter for their respective On demand (On demand) PRS/SRSs, that is, the serving base station and the neighboring base station respectively determine corresponding target positioning assistance data. In the present application, descriptions are made based on a situation where TRPs participating in transmission or reception of On demand PRS/SRSs belong to a serving base station and a neighboring base station.

After receiving the positioning QoS information transmitted by the terminal device, the first network element can determine initial positioning assistance data according to the positioning QoS information, and transmit the initial positioning assistance data to the first network device or directly transmit the received positioning QoS information to the first network device, and the first network device can determine the positioning assistance data according to the positioning QoS information.

For the case where the first network element determines the initial positioning assistance data, that is, the second message transmitted by the first network element includes the initial positioning assistance data corresponding to the positioning QoS information, an association relationship among the positioning QoS information, a configuration parameter of a positioning reference signal and a threshold value corresponding to the configuration parameter is pre-stored in the first network element. Among them, the configuration parameter of the positioning reference signal includes a PRS/SRS frequency domain bandwidth X, the number of PRS/SRS time domain orthogonal frequency division multiplexing (Orthogonal Frequency Division Multiplexing, OFDM) symbols Y, a PRS beam width Z, a Muting mechanism activation flag, a reference signal period T1, and a measurement reporting period T2. In addition, each configuration parameter corresponds to its own threshold value, for example, the PRS/SRS frequency domain bandwidth X corresponds to a threshold value of X_th, the number of OFDM symbols Y corresponds to a threshold value of Y_th, the PRS beam width Z corresponds to a threshold value of Z_th, the reference signal period T1 corresponds to a threshold value of T1_th, and the measurement reporting period T2 corresponds to a threshold value of T2_th. Among them, specific values of the aforementioned threshold values are associated with capabilities that the terminal device can support, that is, the specific values of the aforementioned threshold values vary depending on the capabilities of the terminal device. Appreciatively, the capabilities that the terminal device can support include a capability that the terminal device possesses, a capability of the terminal device to process data or information, or a data processing mode or algorithm that the terminal device can support.

Exemplarily, the aforementioned association relationship among the positioning QoS information, the configuration parameter of the positioning reference signal and the threshold value corresponding to the configuration parameter can be determined in advance simulatively or according to an existing test result.

Exemplarily, Table 1 shows a possible association relationship among positioning QoS information, a configuration parameter of a positioning reference signal and a threshold value corresponding to the configuration parameter:

TABLE 1

| Positioning QoS information (Positioning precision/positioning latency/high-speed or low-speed application scenario of terminal device/priority * 2) | Configuration parameter of positioning reference signal | | | | | |
|---|---|---|---|---|---|---|
| | PRS/SRS frequency domain bandwidth X (PRB) | Number of PRS/SRS time domain OFDM symbols Y | PRS beam width Z (degree) | Muting mechanism activation flag | Reference signal period T1 (ms) | Measurement reporting period T2 (ms) |
| Level A: high positioning precision | >[X_th] | — | <[Z_th] | YES | — | — |
| Level B: low positioning precision | <[X_th] | — | >[Z_th] | NO | — | — |
| Level C: high positioning latency | — | — | — | — | >[T1_th] | >[T2_th] |
| Level D: low positioning latency | — | — | — | — | <[T1_th] | <[T2_th] |
| Level E: high speed scenario | — | <[Y_th] | — | — | — | — |
| Level F: low speed scenario | — | >[Y_th] | — | — | — | — |
| Level A&C&E | >[X_th] | <[Y_th] | <[Z_th] | YES | >[T1_th] | >[T2_th] |
| Level A&C&F | >[X_th] | >[Y_th] | <[Z_th] | YES | >[T1_th] | >[T2_th] |
| Level A&D&E | >[X_th] | <[Y_th] | <[Z_th] | YES | <[T1_th] | <[T2_th] |
| Level A&D&F | >[X_th] | >[Y_th] | <[Z_th] | YES | <[T1_th] | <[T2_th] |
| Level B&C&E | <[X_th] | <[Y_th] | >[Z_th] | NO | >[T1_th] | >[T2_th] |
| Level B&C&F | <[X_th] | >[Y_th] | >[Z_th] | NO | >[T1_th] | >[T2_th] |
| Level B&D&E | <[X_th] | <[Y_th] | >[Z_th] | NO | <[T1_th] | <[T2_th] |
| Level B&D&F | <[X_th] | >[Y_th] | >[Z_th] | NO | <[T1_th] | <[T2_th] |

In Table 1, the high positioning precision can be interpreted as the positioning precision being greater than a first preset value, and the low positioning precision can be interpreted as the positioning precision being no greater than the first preset value; the high positioning latency can be interpreted as the positioning latency being greater than a second preset value, and the low positioning latency can be interpreted as the positioning latency being no greater than the second preset value; the high speed scenario can be interpreted as a moving speed of the terminal device being greater than a third preset value, e.g., in a high-speed rail, subway or light rail scenario, and the low speed scenario can be interpreted as a moving speed of the terminal device being no greater than the third preset value, e.g., in a running scenario, etc.

It should be noted that the aforementioned association relationship among the positioning QoS information, the configuration parameter of the positioning reference signal and the threshold value corresponding to the configuration parameter, in addition to being stored in a tabular form shown in Table 1, can also be explicitly defined by a protocol or defined by a function, for example, by Equation (1) as follows:

$$\text{Positioning reference signal configuration parameter } Y\_set = \quad (1)$$
$$f(\text{positioning } QoS \text{ information } X1\_set,$$
$$\text{terminal device capability information } X2).$$

The terminal device capability information X2 is used to determine different threshold values. Therefore, if the first message transmitted by the terminal device also includes capability information of the terminal device, the first network element will update or adjust the threshold value corresponding to the configuration parameter according to the received capability information. For example, if the terminal device has a strong capability to process data, the threshold value corresponding to the configuration parameter can be updated to a relatively large value; if the terminal device has a weak capability to process data, the threshold value corresponding to the configuration parameter can be updated to a relatively small value, and so on. In addition, the threshold value corresponding to the capability information of the terminal device included in the first message also can be updated according to a preset association relationship between the capability information of the terminal device and the threshold value corresponding to the configuration parameter.

Exemplarily, the terminal device may carry the aforementioned capability information of the terminal device in the first message and transmit the same to the first network element, or the terminal device may carry it in another message and transmit the same to the first network element, which is not limited in the embodiments of the present application.

Since the first network element can update the threshold value corresponding to the configuration parameter according to the capability information of the terminal device, it is possible to avoid a phenomenon that all terminal devices use a same threshold value, therefore, not only the flexibility of threshold value selection is improved for the configuration parameter, but also a different threshold value can be determined for each terminal device, to improve the accuracy of positioning assistance data.

Further, in addition to the association relationship as described above in Table 1 and/or the association relationship in Equation (1), the first network element also has, stored therein, an association relationship between the positioning QoS information and a positioning method, where the positioning method includes an uplink positioning method, a downlink positioning method and an uplink-downlink positioning method, such as multi round-trip time (Multi Round-Trip Time, Multi-RTT).

After receiving the positioning QoS information transmitted by the terminal device, the first network element will determine, according to the pre-stored association relationship between the positioning QoS information and the positioning method, a positioning method to be used. In addition, the configuration parameter of the positioning reference signal also needs to be determined according to the positioning method. For example, if the positioning method is an uplink positioning method, the configuration parameter of the positioning reference signal will include a PRS frequency domain bandwidth, the number of PRS OFDM symbols, a PRS beam width, a Muting mechanism activation flag, a reference signal period T1, and a measurement reporting period T2, etc. If the positioning method is a downlink positioning method, the configuration parameter of the positioning reference signal will include an SRS frequency domain bandwidth, the number of SRS OFDM symbols, a Muting mechanism activation flag, a reference signal period T1, and a measurement reporting period T2, etc. If the positioning method is a joint uplink-downlink (that is, uplink+downlink) positioning method, the configuration parameter of the positioning reference signal will include a PRS frequency domain bandwidth, an SRS frequency domain bandwidth, the number of PRS OFDM symbols, the number of SRS OFDM symbols, a PRS beam width, a Muting mechanism activation flag, a reference signal period T1, and a measurement reporting period T2, etc.

In the present embodiment, descriptions are made based on the uplink positioning method. After determining the configuration parameter of the positioning reference signal, the first network element will determine a value of the configuration parameter corresponding to the positioning QoS information according to the association relationship as shown in Table 1 or Equation (1) among the positioning QoS information, the configuration parameter of the positioning reference signal and the threshold value corresponding to the configuration parameter, and determine the value as the initial positioning assistance data.

For example, when the positioning QoS information indicates a high positioning precision, a low positioning latency and the terminal device being applied in a high-speed scenario, the first network element determines the positioning method as the uplink positioning method according to the positioning QoS information; and according to the association relationship in Table 1, the initial positioning assistance data determined by the first network element is: the PRS frequency domain bandwidth being greater than the threshold value X_th, the number of PRS time domain OFDM symbols being less than the threshold value Y_th, the PRS beam width being less than the threshold value Z_th, the Muting mechanism activation flag being YES, the reference signal period T1 being less than the threshold value T1_th, and the measurement reporting period T2 being less than the threshold value T2_th.

In the present embodiment, the first network element can determine the value of the configuration parameter corresponding to the positioning QoS information according to the pre-stored association relationship among the positioning QoS information, the configuration parameter of the positioning reference signal and the threshold value corresponding to the configuration parameter, and determine the value as the initial positioning assistance data, and the positioning assistance data can be associated with the positioning QoS information of the terminal device, to avoid a phenomenon in the prior art that all terminal devices are uniformly assigned with positioning assistance data. Instead, the positioning QoS information of each terminal device is considered, and corresponding positioning assistance data is assigned to the terminal device, and not only the positioning precision and the positioning latency can be ensured for the terminal device, but also overheads for system resources and a waste of resources can be reduced.

Further, if the first network element receives the first message transmitted by at least two terminal devices in cells managed by the same base station, the first network element can firstly acquire a respective priority of each terminal device. In this way, when determining the value of the configuration parameter corresponding to the positioning QoS information according to the pre-stored association relationship among the positioning QoS information, the configuration parameter of the positioning reference signal and the threshold value corresponding to the configuration parameter, the first network element will determine positioning QoS information of a terminal device of the at least two terminal devices with a highest or lowest priority as target positioning QoS information, and then determine a value of a configuration parameter corresponding to the target positioning QoS information according to the pre-stored association relationship among the positioning QoS information, the configuration parameter of the positioning reference signal and the threshold value corresponding to the configuration parameter.

Specifically, the aforementioned priority of the terminal device can be carried in the first message for transmission to the first network element, or can be determined by the first network element according to the positioning QoS information transmitted by each terminal device.

If the at least two terminal devices respectively correspond to different priorities, the first network element can determine positioning QoS information of a terminal device with a highest or lowest priority as target positioning QoS information according to the priority of each terminal device, where the determined target positioning QoS information will be positioning QoS information shared by all terminal devices. The first network element will determine a value of a configuration parameter corresponding to the target positioning QoS information according to the association relationship among the positioning QoS information, the configuration parameter of the positioning reference signal and the threshold value corresponding to the configuration parameter, and determine the value as the initial positioning assistance data.

After the initial positioning assistance data is determined, the first network element transmits the initial positioning assistance data to the first network device.

It will be appreciated that the first network element may also transmit the determined priority of each terminal device to the first network device, and the first network device determines the target positioning QoS information according to the priority.

In the present embodiment, the first network element can determine final target positioning QoS information according to respective priorities of the at least two terminal devices, and the corresponding initial positioning assistance data can be determined, to improve the accuracy of the initial positioning assistance data.

In addition, the first network element may also directly transmit the received positioning QoS information to the first network device, and the first network device determines the positioning assistance data. The determination of the positioning assistance data by the first network device will be described hereunder in details.

Step 303: the first network device determines first target positioning assistance data according to the positioning QoS information or the initial positioning assistance data.

In this step, if the second message includes the positioning QoS information of the terminal device, the first network device, when determining the first target positioning assistance data, can determine the value of the configuration parameter corresponding to the positioning QoS information according to the pre-stored association relationship among the positioning QoS information, the configuration parameter of the positioning reference signal and the threshold value corresponding to the configuration parameter, and determine the first target positioning assistance data according to the value of the configuration parameter.

Specifically, in one possible implementation, the second message transmitted by the first network element to the first network device further includes an association relationship among the positioning QoS information, a configuration parameter of a positioning reference signal and a threshold value corresponding to the configuration parameter, and the first network device will store the association relationship locally.

In this approach, since the first network element can transmit an association relationship among the positioning QoS information, a configuration parameter of a positioning reference signal and a threshold value corresponding to the configuration parameter to the first network device in advance, and the first network device will store the association relationship locally, and the first network device can directly determine initial positioning assistance data according to the association relationship after receiving the positioning QoS information transmitted by the first network element, and thus each time when determining the initial positioning assistance data, there is no need for the first network element to transmit the association relationship to the first network device, therefore, the efficiency of determining the initial positioning assistance data can be improved.

In another possible implementation, the first network element and the first network device can be stored with an association relationship between positioning QoS information and a configuration parameter of a positioning reference signal, and for a threshold value corresponding to the configuration parameter, a preset value or a fixed value can be used.

In yet another possible implementation, the first message received by the first network element from the terminal device includes capability information of the terminal device, the first network element can determine a threshold value of a configuration parameter of a positioning reference signal corresponding to the positioning QoS information according to the capability information of the terminal device, and include the threshold value in the second message. In this approach, the network device is pre-stored with an association relationship between the positioning QoS information and a configuration parameter of a positioning reference signal, and the first network element, after receiving the first message, can determine a threshold value corresponding to a configuration parameter of a respective positioning reference signal according to the association relationship between the capability information of the terminal device and the threshold value as well as according to the capability information of the terminal device included in the first message, and carry the threshold value in the second message for transmission to the network device. After receiving the threshold value corresponding to the configuration parameter of the respective positioning reference signal, the network device will determine the initial positioning assistance data in conjunction with the pre-stored association relationship between the positioning QoS information and the configuration parameter of the positioning reference signal.

In addition, the first network element can also update the threshold value corresponding to the configuration parameter according to the capability information of the terminal device, and after the updating completes, the updated threshold value can be carried in the second message for transmission to the first network device.

In this approach, the first network element can determine the threshold value of the configuration parameter of the positioning reference signal based on the capability information of the terminal device, therefore, not only the flexibility of threshold value selection is improved for the configuration parameter, but also a different threshold value can be determined for each terminal device, to improve the accuracy of the determined positioning assistance data.

Further, the association relationship among the positioning QoS information, the configuration parameter of the positioning reference signal and the threshold value corresponding to the configuration parameter is similar to the association relationship described in Table 1 or Equation (1), and details will not be described herein.

After acquiring the association relationship among the positioning QoS information, the configuration parameter of the positioning reference signal and the threshold value corresponding to the configuration parameter, the first network device will determine the value of the configuration parameter corresponding to the positioning QoS information. Exemplarily, the first network device can directly determine the determined value of the configuration parameter as the first target positioning assistance data, or adjust the value of the configuration parameter according to resource allocation and to obtain the first target positioning assistance data.

In this approach, the first network device can determine a value of a configuration parameter corresponding to the positioning QoS information according to an association relationship among the positioning QoS information, a configuration parameter of a positioning reference signal and a threshold value corresponding to the configuration parameter, and then determine first target positioning assistance data according to the value, and corresponding first target positioning assistance data can be assigned to each terminal device separately in light of positioning QoS information of each terminal device, instead of uniformly assigning positioning assistance data for all terminal devices. In this way, because the positioning QoS information of each terminal device is considered, the positioning assistance data is assigned to the terminal device, therefore, not only the positioning precision and the positioning latency of the terminal device can be ensured, but also overheads for system resources and a waste of resources can be reduced.

If the second message includes the initial positioning assistance data corresponding to the positioning QoS information, the first network device can directly determine the initial positioning assistance data determined by the first network element, as the first target positioning assistance data, and thus the efficiency of determining the first target positioning assistance data can be improved. In addition, the first network device can also adjust the initial positioning assistance data according to resource allocation and to obtain the first target positioning assistance data, and thus the utilization of resources can be improved.

Exemplarily, if the first network element receives the first message transmitted by at least two terminal devices, the first network element will determine a priority of each terminal device, and transmit the priority of each terminal device to the first network device, and the first network device can determine positioning QoS information of a terminal device with a highest or lowest priority as target positioning QoS information according to the priority of each terminal device, and in conjunction with an association relationship among the positioning QoS information, a configuration parameter of a positioning reference signal and a threshold value corresponding to the configuration parameter, determine a value of a configuration parameter corresponding to the target positioning QoS information and to determine the initial positioning assistance data.

Step 304: the first network device transmits the first target positioning assistance data to the first network element and the terminal device respectively, where the first target positioning assistance data is associated with the positioning QoS information.

In this step, after the first target positioning assistance data is determined, the first network device will transmit the first target positioning assistance data to the first network element. Since the first target positioning assistance data is associated with the positioning QoS information, a different piece of target positioning assistance information can be allocated to a different terminal device according to the positioning QoS information of the terminal device. Therefore, not only the positioning precision and the positioning latency of the terminal device can be ensured, but also overheads for system resources and a waste of resources can be reduced.

Furthermore, the first network device will also transmit the first target positioning assistance data and the positioning method to the terminal device.

Step 305: the first network element transmits the first target positioning assistance data to a second network device.

In this step, the second network device is a neighboring base station of the terminal device. After receiving the first target positioning assistance data transmitted by the first network device, the first network element will transmit the first target positioning assistance data to the second network device.

Step 306: the first network element receives a first positioning measurement from the first network device and a second positioning measurement from the second network device.

The first positioning measurement is obtained upon measurement performed by the first network device on an uplink positioning reference signal SRS-Pos after receiving the uplink positioning reference signal SRS-Pos according to the first target positioning assistance data, and the second positioning measurement is obtained upon measurement performed by the second network device on the uplink positioning reference signal SRS-Pos after receiving the uplink positioning reference signal SRS-Pos according to the first target positioning assistance data.

In this step, if the positioning method determined by the first network element is an uplink positioning method, the terminal device, after receiving the first target positioning assistance data transmitted by the first network device, will transmit an uplink positioning reference signal SRS-Pos to the first network device and the second network device respectively according to the first target positioning assistance data.

For the first network device, it will acquire a time-frequency resource configuration parameter of the uplink positioning reference signal SRS-Pos according to the first target positioning assistance data determined by itself, and then according to the time-frequency resource configuration parameter, receive the uplink positioning reference signal SRS-Pos transmitted by the terminal device, and measure the received uplink positioning reference signal SRS-Pos to obtain the first positioning measurement. Furthermore, the first network device can transmit the determined first positioning measurement to the first network element.

For the second network device, it will acquire a time-frequency resource configuration parameter of the uplink positioning reference signal SRS-Pos according to the first target positioning assistance data transmitted by the first network element, and then according to the time-frequency resource configuration parameter, receive the uplink positioning reference signal SRS-Pos transmitted by the terminal device, and measure the received uplink positioning reference signal SRS-Pos to obtain the second positioning measurement. Furthermore, the first network device can transmit the determined first positioning measurement to the first network element.

Step 307: the first network element determines location information of the terminal device according to the first positioning measurement and the second positioning measurement.

In this step, after acquiring the first positioning measurement and the second positioning measurement, the first network element will resolve the location information of the terminal device in conjunction with the location information of the first network device and the second network device.

According to a method for positioning a terminal device as provided in an embodiment of the present application, a first message received by a first network element from a terminal device includes positioning QoS information, the first network element can determine initial positioning assistance data according to the positioning QoS information and transmit the initial positioning assistance data to a first network device, or the first network element can directly transmit the positioning QoS information to the first network device, and the first network device determines first target positioning assistance data according to the initial positioning assistance data or the positioning QoS information, and thus the first network element is enabled to acquire a positioning measurement corresponding to the first target positioning assistance data and to determine location information of the terminal device. The first network device, when assigning the first target positioning assistance data to the terminal device, may consider positioning QoS information of each terminal device, and assign corresponding first target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

Figure 4:
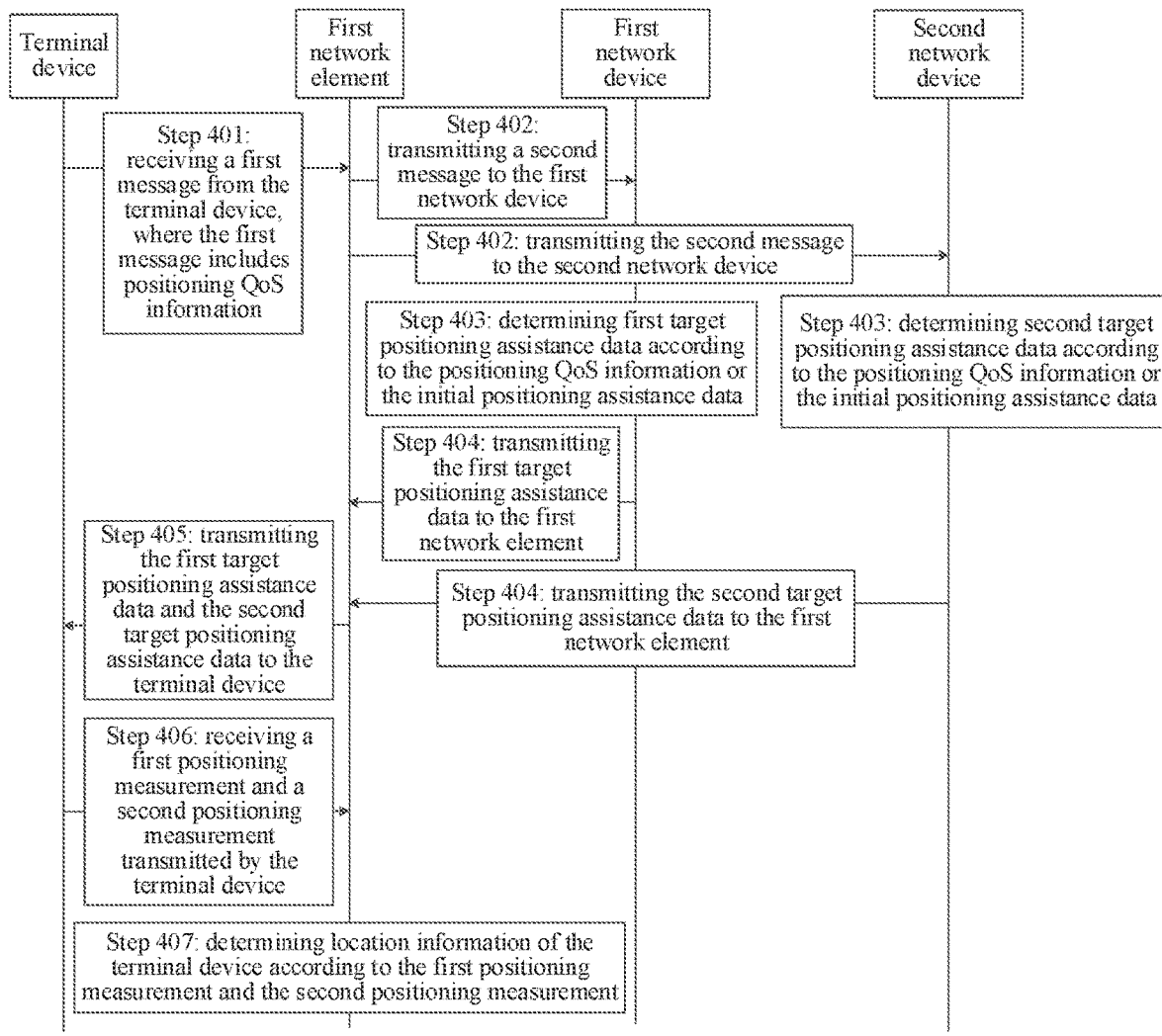
FIG. 4 is a signaling flow diagram of a method for positioning a terminal device according to another embodiment of the present application.

FIG. 4 is a signaling flow diagram of a method for positioning a terminal device according to another embodiment of the present application. In the present embodiment, detailed descriptions will be made to the scheme where the LMF determines location information of a terminal device with a downlink positioning method. As shown in FIG. 4, the method includes the following steps.

Step 401: a first network element receives a first message from a terminal device, where the first message includes positioning QoS information.

Step 401 is similar to Step 301, and for concrete contents, reference can be made to the description of Step 301, and details will not be described here again.

Step 402: the first network element transmits a second message to a first network device and a second network device respectively, where the second message includes the positioning QoS information or initial positioning assistance data corresponding to the positioning QoS information.

The first network device includes a serving base station of the terminal device, and the second network device includes a neighboring base station of the terminal device. Exemplarily, when transmission receipt points (Transmission Receipt Point, TRP) participating in transmission or reception of On demand (On demand) PRS/SRSs belong to a same serving base station, the serving base station determines a time frequency resource configuration parameter for the On demand (On demand) PRS/SRSs, that is, determining target positioning assistance data. When the TRPs participating in transmission or reception of the On demand PRS/SRSs belong to a serving base station and a neighboring base station, the serving base station and the neighboring base station respectively determine a time-frequency resource configuration parameter for their respective On demand (On demand) PRS/SRSs, that is, the serving base station and the neighboring base station respectively determine corresponding target positioning assistance data. In the present application, descriptions are made based on a situation where TRPs participating in transmission or reception of On demand PRS/SRSs belong to a serving base station and a neighboring base station.

The manner in which the first network element, after receiving the positioning QoS information transmitted by the terminal device, determines initial positioning assistance data according to the positioning QoS information is similar to the manner in Step 302, and for concrete contents, reference can be made to the description of Step 302, and details will not be described here again.

After the initial positioning assistance data is determined, the first network element transmits the initial positioning assistance data to the first network device and the second network device.

Appreciatively, for a case with multiple terminal devices, the first network element can also transmit a determined priority of each terminal device to the first network device and the second network device, and the first network device and the second network device each determine target positioning QoS information according to the priority. After the target positioning QoS information is determined, the manner in which the second network device determines the initial positioning assistance data according to the target positioning QoS information determined by itself is similar to the manner in which the first network device determines the initial positioning assistance data, and details will not be described here again.

In addition, the first network element can also directly transmit the received positioning QoS information to the first network device and the second network device, and the first network device and the second network device determine the positioning assistance data. The determination of the positioning assistance data by the first network device and the second network device will be described hereunder in details.

Step 403: the first network device determines first target positioning assistance data according to the positioning QoS information or the initial positioning assistance data; and the second network device determines second target positioning assistance data according to the positioning QoS information or the initial positioning assistance data.

If the second message includes the positioning QoS information of the terminal device, the first network device will determine the first target positioning assistance data according to the positioning QoS information, and the second network device will determine the second target positioning assistance data according to the positioning QoS information. The first network device and the second network device determine the target positioning assistance data in a similar manner, reference for which can be made to the description in Step 303; and details will not be described here again.

If the second message includes the initial positioning assistance data corresponding to the positioning QoS information, the first network device can directly determine the initial positioning assistance data determined by the first network element, as the first target positioning assistance data, and thus the efficiency of determining the first target positioning assistance data can be improved. In addition, the first network device can also adjust the initial positioning assistance data according to resource allocation and to obtain the first target positioning assistance data, and thus the utilization of resources can be improved.

Similarly, for the second network device, the second network device can directly determine the initial positioning assistance data determined by the first network element, as the second target positioning assistance data, and thus the efficiency of determining the second target positioning assistance data can be improved. In addition, the second network device can also adjust the initial positioning assistance data according to resource allocation and to obtain the second target positioning assistance data, and thus the utilization of resources can be improved.

Step 404: the first network element receives the first target positioning assistance data transmitted by the first network device and the second target positioning assistance data transmitted by the second network device, respectively.

Both the first target positioning assistance data and the second target positioning assistance data are associated with the positioning QoS information.

Since both the first target positioning assistance data and the second target positioning assistance data are associated with the positioning QoS information, a different piece of target positioning assistance information can be allocated to a different terminal device according to the positioning QoS information of the terminal device. Therefore, not only the positioning precision and the positioning latency of the terminal device can be ensured, but also overheads for system resources and a waste of resources can be reduced.

Step 405: the first network element transmits the first target positioning assistance data and the second target positioning assistance data to the terminal device.

In this step, after receiving the first target positioning assistance data and the second target positioning assistance data, the first network element will transmit the first target positioning assistance data and the second target positioning assistance data to the terminal device.

Step 406: the first network element receives a first positioning measurement and a second positioning measurement transmitted by the terminal device.

The first positioning measurement is obtained by the terminal device by receiving, according to the first target positioning assistance data, a first downlink positioning reference signal transmitted by the first network device and measuring the first downlink positioning reference signal, and the second positioning measurement is obtained by the terminal device by receiving, according to the second target positioning assistance data, a second downlink positioning reference signal transmitted by the second network device and measuring the second downlink positioning reference signal.

In this step, if the positioning method determined by the first network element is a downlink positioning method, the terminal device, after receiving the first target positioning assistance data and the second target positioning assistance data transmitted by the first network element, will determine a time-frequency resource configuration parameter of a first downlink positioning reference signal PRS based on the first target positioning assistance data; and according to the time-frequency resource configuration parameter of the first downlink positioning reference signal PRS, the terminal device will receive the first downlink positioning reference signal PRS transmitted by the first network device, and measure the first downlink positioning reference signal PRS to obtain the first positioning measurement. Similarly, the terminal device can determine a time-frequency resource configuration parameter of a second downlink positioning reference signal PRS based on the second target positioning assistance data; and according to the time-frequency resource configuration parameter of the second downlink positioning reference signal PRS, the terminal device will receive the second downlink positioning reference signal PRS transmitted by the second network device, and measure the second downlink positioning reference signal PRS to obtain the second positioning measurement.

After the first positioning measurement and the second positioning measurement are determined, the terminal device can transmit the first positioning measurement and the second positioning measurement to the first network element.

Step 407: the first network element determines location information of the terminal device according to the first positioning measurement and the second positioning measurement.

In this step, after acquiring the first positioning measurement and the second positioning measurement, the first network element will resolve the location information of the terminal device in conjunction with the location information of the first network device and the second network device.

According to a method for positioning a terminal device as provided in an embodiment of the present application, a first message received by a first network element from a terminal device includes positioning QoS information, the first network element can determine initial positioning assistance data according to the positioning QoS information and transmit the initial positioning assistance data to a first network device and a second network device, or the first network element can directly transmit the positioning QoS information to the first network device and the second network device, and the first network device and the second network device determine first target positioning assistance data and second target positioning assistance data according to the initial positioning assistance data or the positioning QoS information, and thus the first network element is enabled to acquire a first positioning measurement corresponding to the first target positioning assistance data and a second positioning measurement corresponding to the second target positioning assistance data and to determine location information of the terminal device. The first network device and the second network device, when assigning the first target positioning assistance data and the second target positioning assistance data to the terminal device, may consider positioning QoS information of each terminal device, and assign corresponding first target positioning assistance data and second target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

Detailed description will be made hereunder with separate specific examples in which the positioning method is uplink positioning, downlink positioning, and joint uplink-downlink (uplink+downlink) positioning implementations.

Figure 5A:
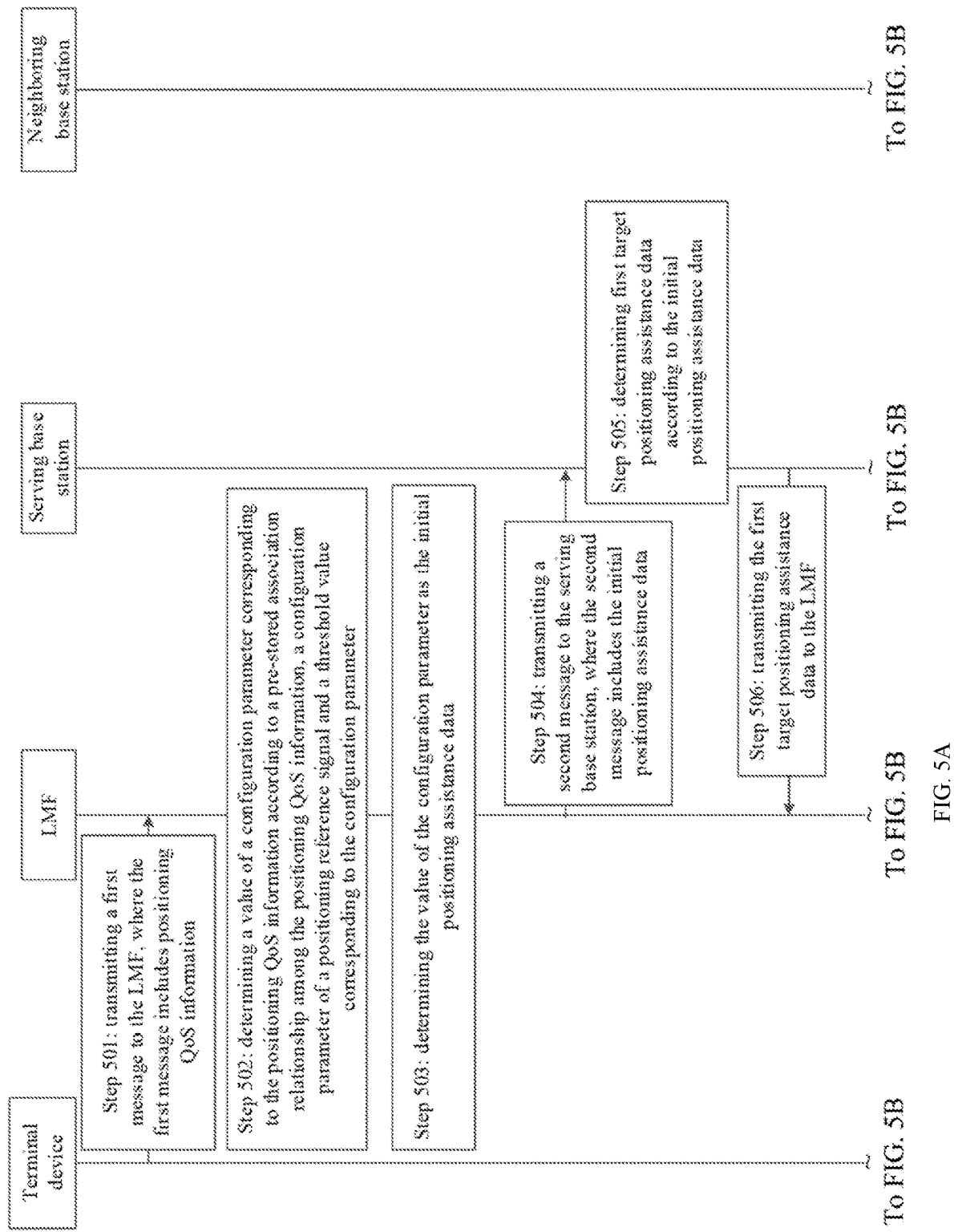
FIGS. 5A and 5B are signaling flow diagrams of determining positioning information of a terminal device with an uplink positioning method according to the present application.
Figure 5B:
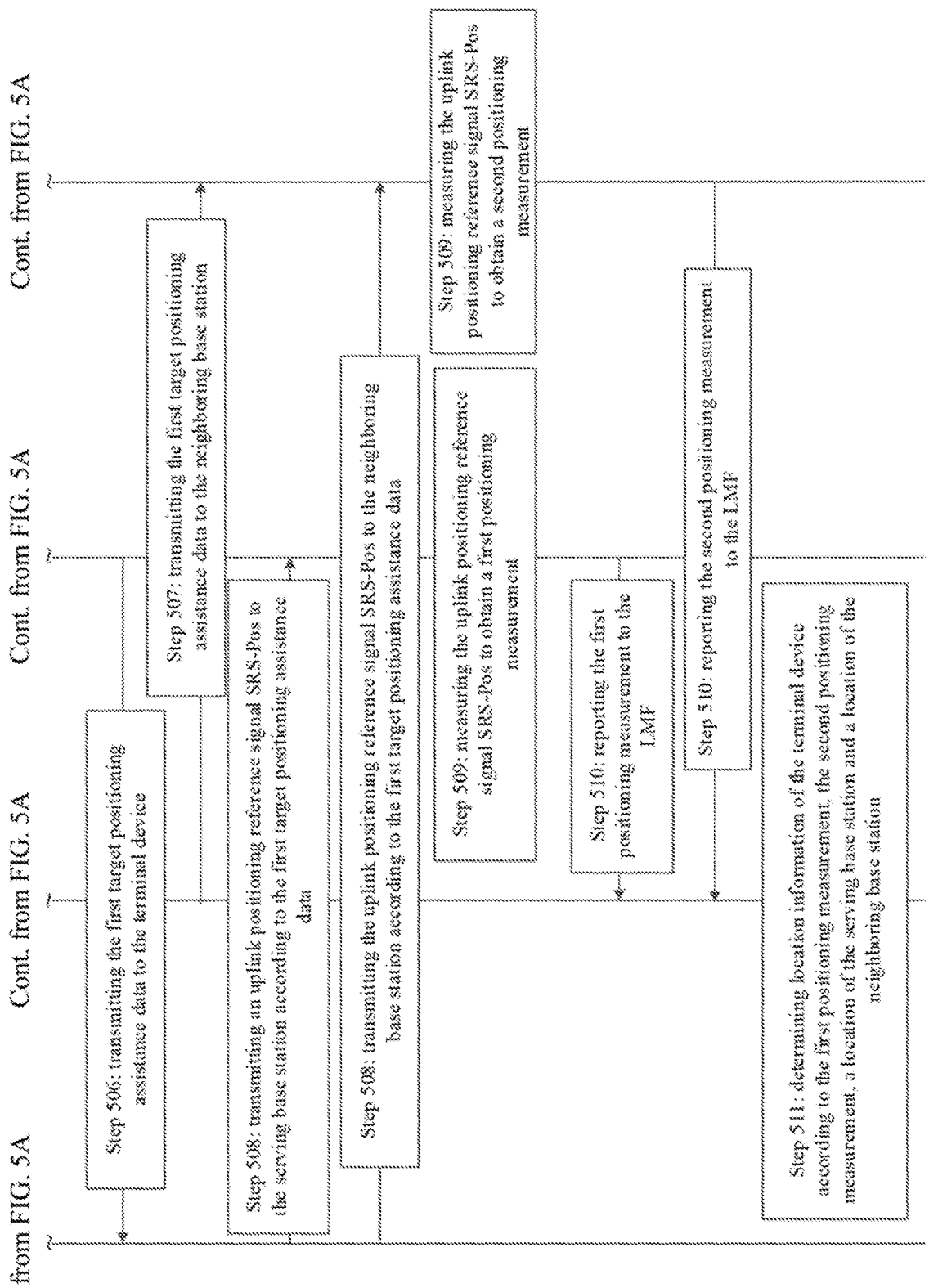

FIGS. 5A and 5B are signaling flow diagrams of determining positioning information of a terminal device with an uplink positioning method according to the present application. In the present embodiment, description is made by taking an example where the first network element is an LMF, the first network device is a serving base station of the terminal device, the second network device is a neighboring base station of the terminal device, and the first network element determines the initial positioning assistance data according to a pre-stored association relationship among the positioning QoS information, a configuration parameter of a positioning reference signal and a threshold value corresponding to the configuration parameter. For other situations described in the foregoing embodiments, they are implemented in a process similar to that in the present embodiment, and details will not be described here again. As shown in FIGS. 5A and 5B, the method includes the following steps.

Step 501: the terminal device transmits a first message to the LMF, where the first message includes positioning QoS information.

Step 502: the LMF determines a value of a configuration parameter corresponding to the positioning QoS information according to a pre-stored association relationship among the positioning QoS information, a configuration parameter of a positioning reference signal and a threshold value corresponding to the configuration parameter.

Exemplarily, assuming that the threshold values in Table 1 are: $X\_th=100$, $Y\_th=6$, $Z\_th\text{-}5$, $T1\_th=20$ and $T2\_th=100$, then the association relationship among the positioning QoS information, a configuration parameter of a positioning reference signal, and a threshold value corresponding to the configuration parameter can be shown in Table 2.

TABLE 2

| Positioning QoS information | Configuration parameter of positioning reference signal | | | | | |
|---|---|---|---|---|---|---|
| (Positioning precision/positioning latency/high-speed or low-speed application scenario of terminal device/priority * 2) | PRS/SRS frequency domain bandwidth (PRB) | Number of PRS/SRS time domain OFDM symbols Y | PRS beam width Z (degree) | Muting mechanism activation flag | Reference signal period T1 (ms) | Measurement reporting period T2 (ms) |
| Level A: high positioning precision | >[100] | — | <[5] | YES | — | — |
| Level B: low positioning precision | <[100] | — | >[5] | NO | — | — |
| Level C: high positioning latency | — | — | — | — | >[20] | >[100] |
| Level D: low positioning latency | — | — | — | — | <[20] | <[100] |
| Level E: high speed scenario | — | <[6] | — | — | — | — |
| Level F: low speed scenario | — | >[6] | — | — | — | — |
| Level A&C&E | >[100] | <[6] | <[5] | YES | >[20] | >[100] |
| Level A&C&F | >[100] | >[6] | <[5] | YES | >[20] | >[100] |
| Level A&D&E | >[100] | <[6] | <[5] | YES | <[20] | <[100] |
| Level A&D&F | >[100] | >[6] | <[5] | YES | <[20] | <[100] |
| Level B&C&E | <[100] | <[6] | >[5] | NO | >[20] | >[100] |
| Level B&C&F | <[100] | >[6] | >[5] | NO | >[20] | >[100] |
| Level B&D&E | <[100] | <[6] | >[5] | NO | <[20] | <[100] |
| Level B&D&F | <[100] | >[6] | >[5] | NO | <[20] | <[100] |

Step 503: the LMF determines the value of the configuration parameter as the initial positioning assistance data.

Step 504: the LMF transmits a second message to the serving base station, where the second message includes the initial positioning assistance data.

Step 505: the serving base station determines first target positioning assistance data according to the initial positioning assistance data, where the first target positioning assistance data is associated with the positioning QoS information of the terminal device.

Step 506: the serving base station transmits the first target positioning assistance data to the LMF and the terminal device respectively.

Step 507: the LMF transmits the first target positioning assistance data to the neighboring base station.

Step 508: the terminal device transmits an uplink positioning reference signal SRS-Pos to the serving base station and the neighboring base station according to the first target positioning assistance data, respectively.

Step 509: the serving base station measures the uplink positioning reference signal SRS-Pos to obtain a first positioning measurement, and the neighboring base station measures the uplink positioning reference signal SRS-Pos to obtain a second positioning measurement.

Step 510: the serving base station reports the first positioning measurement to the LMF, and the neighboring base station reports the second positioning measurement to the LMF.

Step 511: the LMF determines location information of the terminal device according to the first positioning measurement, the second positioning measurement, a location of the serving base station and a location of the neighboring base station.

Exemplarily, the location information of the terminal device can be determined using an uplink relative time of arrival (Uplink relative time of arrival, UL-RTOA).

It will be appreciated that the order of execution between the steps shown in FIGS. 5A and 5B is not limited.

According to a method for positioning a terminal device as provided in an embodiment of the present application, a first message received by an LMF from a terminal device includes positioning QoS information, the LMF can determine initial positioning assistance data according to the positioning QoS information and transmit the initial positioning assistance data to a serving base station, and the serving base station assigns first target positioning assistance data to the terminal device, and thus the LMF is enabled to acquire a positioning measurement corresponding to the first target positioning assistance data and to determine location information of the terminal device. The serving base station, when assigning the first target positioning assistance data to the terminal device, may consider positioning QoS information of each terminal device, and assign corresponding first target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

Figure 6A:
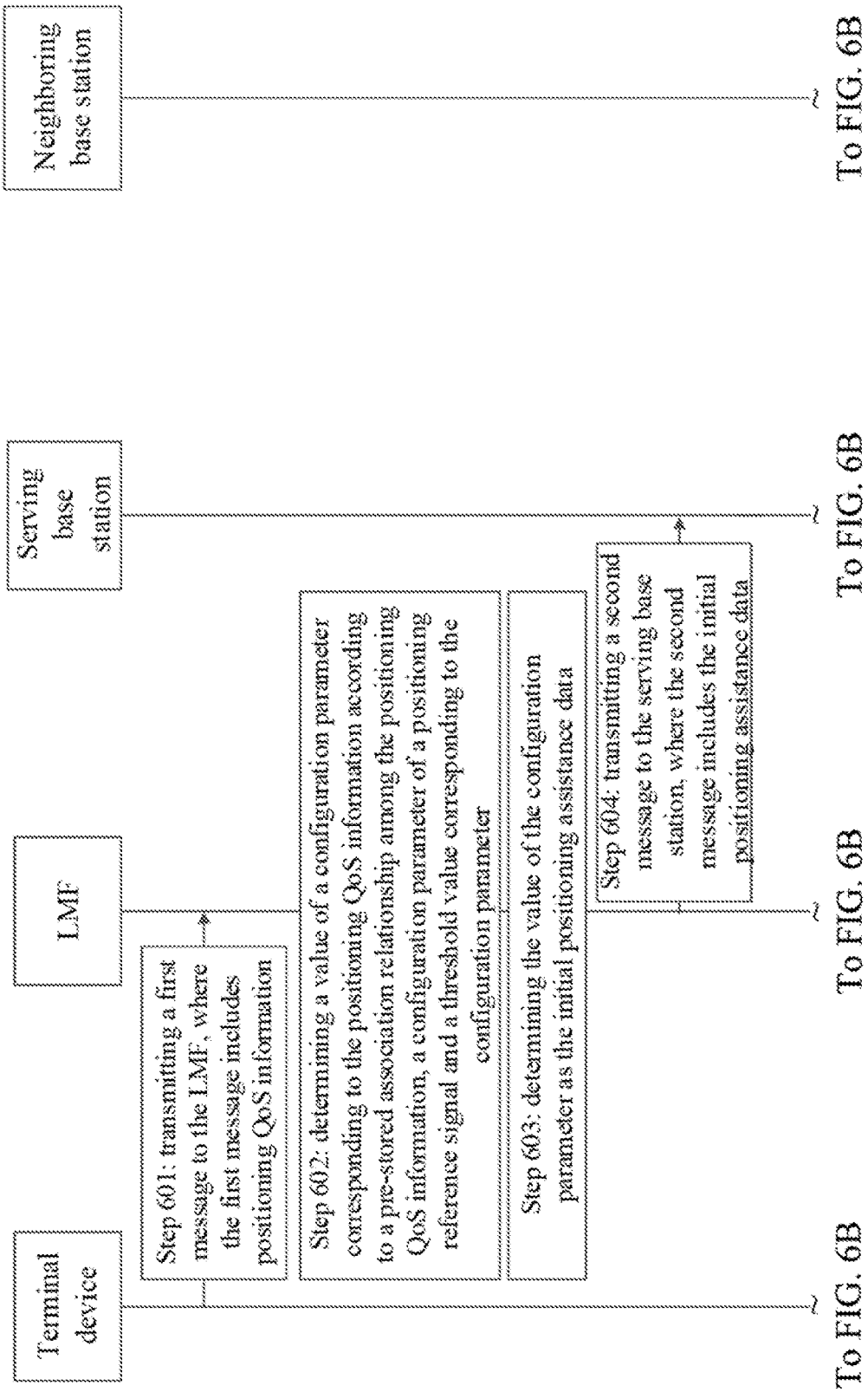
Figure 6B:
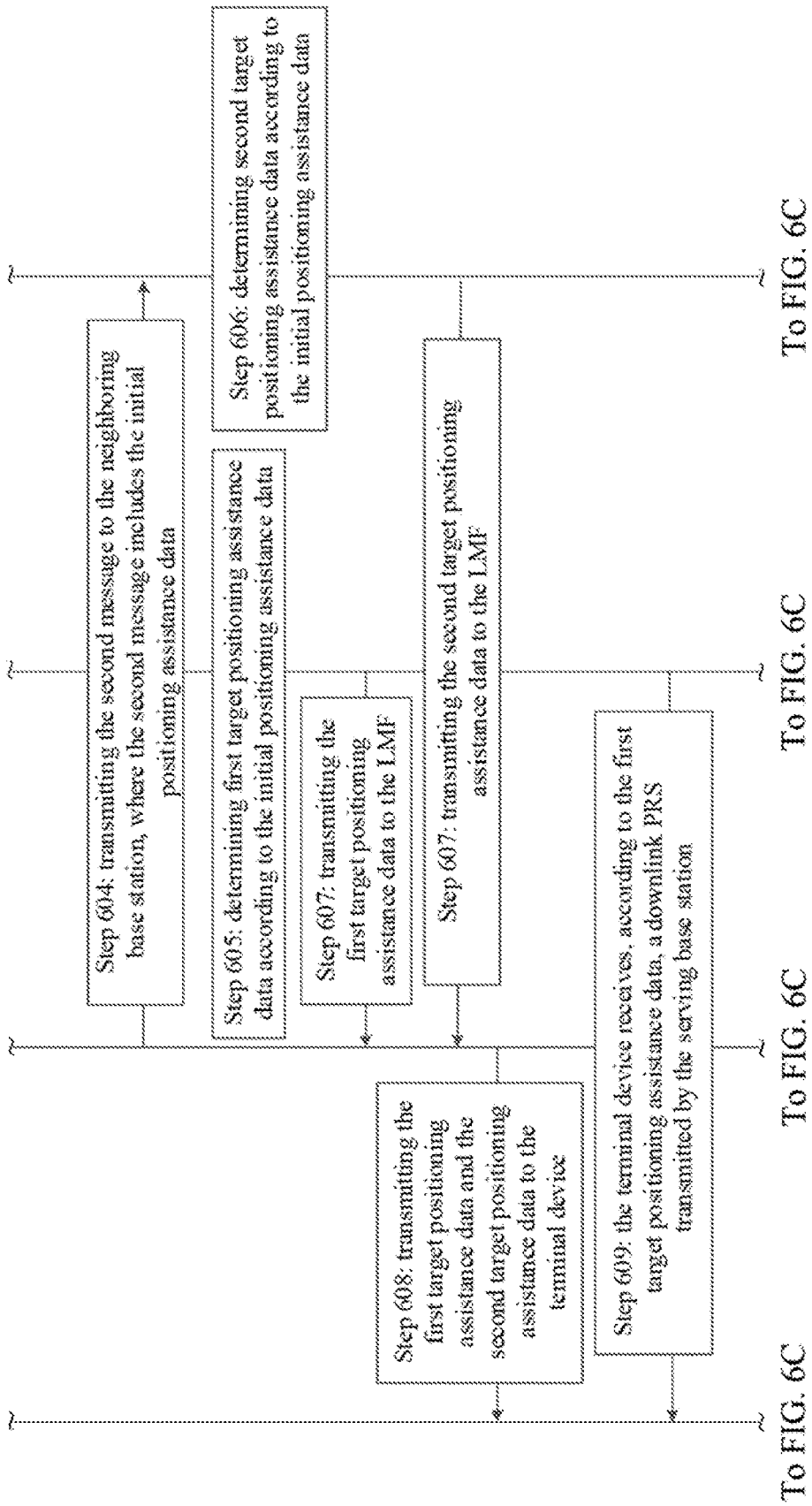

FIG. 6A to FIG. 6C are signaling flow diagrams of determining positioning information of a terminal device with a downlink positioning method according to the present application. In the present embodiment, description is made by taking an example where the first network element is an LMF, the first network device is a serving base station of the terminal device, the second network device is a neighboring base station of the terminal device, and the first network element determines the initial positioning assistance data according to a pre-stored association relationship among the positioning QoS information, a configuration parameter of a positioning reference signal and a threshold value corresponding to the configuration parameter. For other situations described in the foregoing embodiments, they are implemented in a process similar to that in the present embodiment, and details will not be described here again. As shown in FIG. 6A to FIG. 6C, the method includes the following steps.

Step 601: the terminal device transmits a first message to the LMF, where the first message includes positioning QoS information.

Step 602: the LMF determines a value of a configuration parameter corresponding to the positioning QoS information according to a pre-stored association relationship among the positioning QoS information, a configuration parameter of a positioning reference signal and a threshold value corresponding to the configuration parameter.

Exemplarily, assuming that the threshold values in Table 1 are fixed values, in particular: $X\_th=100$, $Y\_th=4$, $Z\_th=10$, $T1\_th=20$ and $T2\_th=100$, then the association relationship among the positioning QoS information, a configuration parameter of a positioning reference signal, and a threshold value corresponding to the configuration parameter can be shown in Table 3.

Step 607: the serving base station transmits the first target positioning assistance data to the LMF, and the neighboring base station transmits the second target positioning assistance data to the LMF.

Step 608: the LMF transmits the first target positioning assistance data and the second target positioning assistance data to the terminal device.

Step 609: the terminal device receives, according to the first target positioning assistance data corresponding to the serving base station, a downlink positioning reference signal PRS transmitted by the serving base station, and receives, according to the second target positioning assistance data corresponding to the neighboring base station, the downlink PRS transmitted by the neighboring base station.

Step 610: the terminal device measures the downlink PRS transmitted by the serving base station to obtain a first positioning measurement corresponding to the serving base station, and measures the downlink PRS transmitted by the neighboring base station to obtain a second positioning measurement corresponding to the neighboring base station, respectively.

TABLE 3

| Positioning QoS information | Configuration parameter of positioning reference signal | | | | | |
| --- | --- | --- | --- | --- | --- | --- |
| (Positioning precision/positioning latency/high-speed or low-speed application scenario of terminal device/priority * 2) | PRS/SRS frequency domain bandwidth X (PRB) | Number of PRS/SRS time domain OFDM symbols Y | PRS beam width Z (degree) | Muting mechanism activation flag | Reference signal period T1 (ms) | Measurement reporting period T2 (ms) |
| Level A: high positioning precision | >[100] | — | <[10] | YES | — | — |
| Level B: low positioning precision | <[100] | — | >[10] | NO | — | — |
| Level C: high positioning latency | — | — | — | — | >[20] | >[100] |
| Level D: low positioning latency | — | — | — | — | <[20] | <[100] |
| Level E: high speed scenario | — | <[4] | — | — | — | — |
| Level F: low speed scenario | — | >[4] | — | — | — | — |
| Level A&C&E | >[100] | <[4] | <[10] | YES | >[20] | >[100] |
| Level A&C&F | >[100] | >[4] | <[10] | YES | >[20] | >[100] |
| Level A&D&E | >[100] | <[4] | <[10] | YES | <[20] | <[100] |
| Level A&D&F | >[100] | >[4] | <[10] | YES | <[20] | <[100] |
| Level B&C&E | <[100] | <[4] | >[10] | NO | >[20] | >[100] |
| Level B&C&F | <[100] | >[4] | >[10] | NO | >[20] | >[100] |
| Level B&D&E | <[100] | <[4] | >[10] | NO | <[20] | <[100] |
| Level B&D&F | <[100] | >[4] | >[10] | NO | <[20] | <[100] |

Step 603: the LMF determines the value of the configuration parameter as the initial positioning assistance data.

Step 604: the LMF transmits a second message to the serving base station and the neighboring base station respectively, where the second message includes the initial positioning assistance data.

Step 605: the serving base station determines first target positioning assistance data according to the initial positioning assistance data, where the first target positioning assistance data is associated with the positioning QoS information of the terminal device.

Step 606: the neighboring base station determines second target positioning assistance data according to the initial positioning assistance data, where the second target positioning assistance data is associated with the positioning QoS information of the terminal device.

Step 611: the terminal device reports the first positioning measurement corresponding to the serving base station and the second positioning measurement corresponding to the neighboring base station to the LMF.

Step 612: the LMF determines location information of the terminal device according to the first positioning measurement corresponding to the serving base station, the second positioning measurement corresponding to the neighboring base station, a location of the serving base station and a location of the neighboring base station.

It will be appreciated that the order of execution between the steps shown in FIG. 6A to FIG. 6C is not limited.

According to a method for positioning a terminal device as provided in an embodiment of the present application, a first message received by an LMF from a terminal device includes positioning QoS information, the LMF can determine initial positioning assistance data according to the positioning QoS information and transmit the initial positioning assistance data to a serving base station and a neighboring base station, and the serving base station and the neighboring base station assign first target positioning assistance data and second target positioning assistance data to the terminal device, and thus the LMF is enabled to acquire positioning measurements corresponding to the first target positioning assistance data and the second target positioning assistance data and to determine location information of the terminal device. The serving base station and the neighboring base station, when assigning the first target positioning assistance data and the second target positioning assistance data to the terminal device, may consider positioning QoS information of each terminal device, and assign corresponding first target positioning assistance data and second target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

Figure 7A:
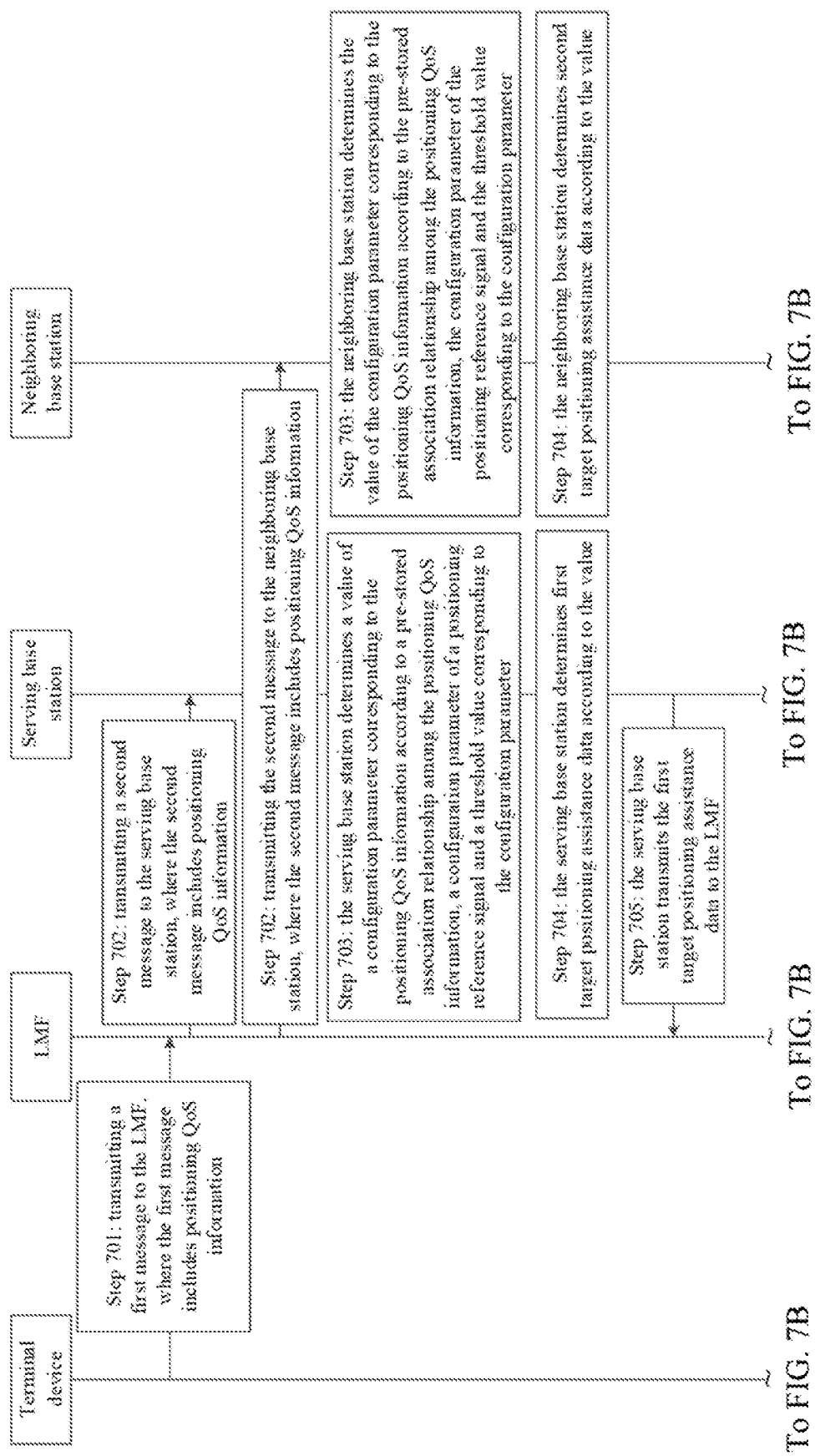
FIG. 7A to FIG. 7C are signaling flow diagrams of determining positioning information of a terminal device with a joint uplink-downlink positioning method according to the present application.
Figure 7B:
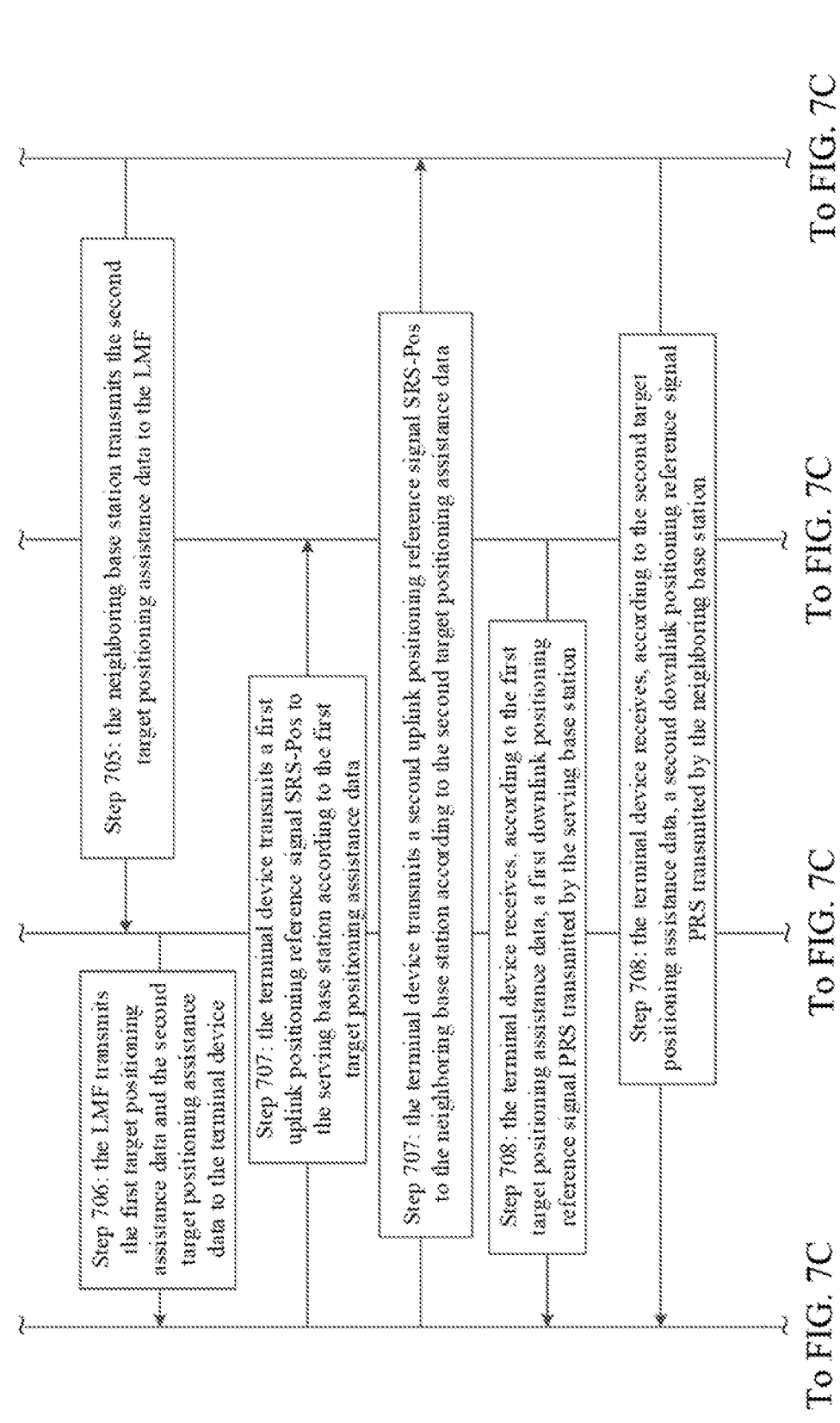
Figure 7C:
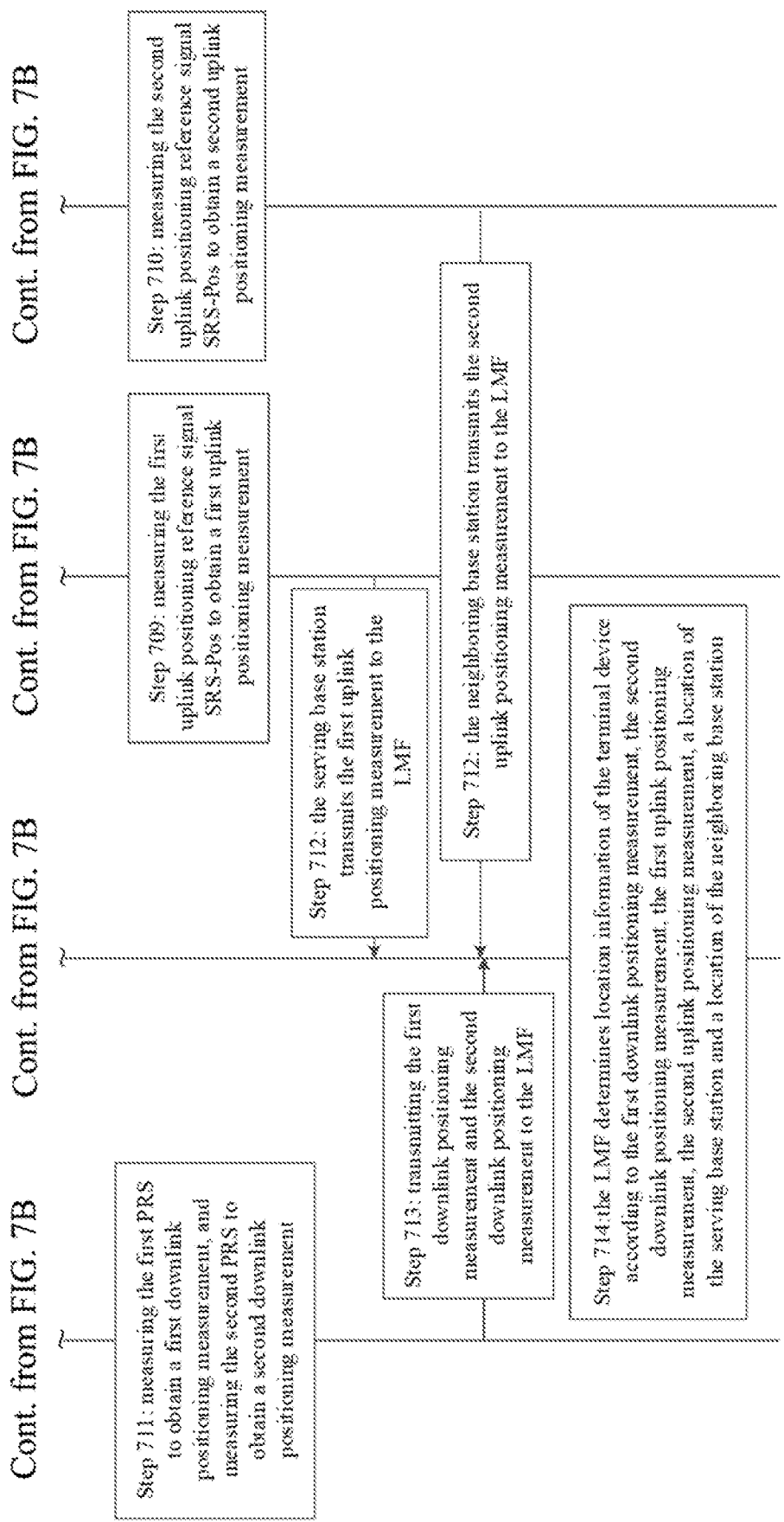

FIG. 7A to FIG. 7C are signaling flow diagrams of determining positioning information of a terminal device with a joint uplink-downlink positioning method according to the present application. In the present embodiment, description is made by taking an example where the first network element is an LMF, the first network device is a serving base station of the terminal device, the second network device is a neighboring base station of the terminal device, the serving base station determines first target positioning assistance data according to a pre-stored association relationship among the positioning QoS information, a configuration parameter of a positioning reference signal and a threshold value corresponding to the configuration parameter, and the neighboring base station determines second target positioning assistance data according to a pre-stored association relationship among the positioning QoS information, a configuration parameter of a positioning reference signal and a threshold value corresponding to the configuration parameter. For other situations described in the foregoing embodiments, they are implemented in a process similar to that in the present embodiment, and details will not be described here again. As shown in FIG. 7A to FIG. 7C, the method includes the following steps.

Step 701: the terminal device transmits a first message to the LMF, where the first message includes positioning QoS information.

Step 702: the LMF transmits a second message to the serving base station and the neighboring base station respectively, where the second message includes positioning QoS information.

Step 703: each of the serving base station and the neighboring base station determines a value of a configuration parameter corresponding to the positioning QoS information according to a pre-stored association relationship among the positioning QoS information, a configuration parameter of a positioning reference signal and a threshold value corresponding to the configuration parameter.

Exemplarily, assuming that the threshold values in Table 1 are fixed values, in particular: X_th-100, Y_th=6, Z_th=5, T1_th=20 and T2_th=100, then the association relationship among the positioning QoS information, a configuration parameter of a positioning reference signal, and a threshold value corresponding to the configuration parameter can be shown in Table 4.

TABLE 4

| Positioning QoS information | Configuration parameter of positioning reference signal | | | | | |
|---|---|---|---|---|---|---|
| (Positioning precision/positioning latency/high-speed or low-speed application scenario of terminal device/priority * 2) | PRS/SRS frequency domain bandwidth X (PRB) | Number of PRS/SRS time domain OFDM symbols Y | PRS beam width Z (degree) | Muting mechanism activation flag | Reference signal period T1 (ms) | Measurement reporting period T2 (ms) |
| Level A: high positioning precision | >[100] | — | <[5] | YES | — | — |
| Level B: low positioning precision | <[100] | — | >[5] | NO | — | — |
| Level C: high positioning latency | — | — | — | — | >[20] | >[100] |
| Level D: low positioning latency | — | — | — | — | <[20] | <[100] |
| Level E: high speed scenario | — | <[6] | — | — | — | — |
| Level F: low speed scenario | — | >[6] | — | — | — | — |
| Level A&C&E | >[100] | <[6] | <[5] | YES | >[20] | >[100] |
| Level A&C&F | >[100] | >[6] | <[5] | YES | >[20] | >[100] |
| Level A&D&E | >[100] | <[6] | <[5] | YES | <[20] | <[100] |
| Level A&D&F | >[100] | >[6] | <[5] | YES | <[20] | <[100] |
| Level B&C&E | <[100] | <[6] | >[5] | NO | >[20] | >[100] |
| Level B&C&F | <[100] | >[6] | >[5] | NO | >[20] | >[100] |
| Level B&D&E | <[100] | <[6] | >[5] | NO | <[20] | <[100] |
| Level B&D&F | <[100] | >[6] | >[5] | NO | <[20] | <[100] |

Step 704: the serving base station determines first target positioning assistance data according to the value and the neighboring base station determines second target positioning assistance data according to the value, where both the first target positioning assistance data are associated with the positioning QoS information of the terminal device.

Step 705: the serving base station transmits the first target positioning assistance data to the LMF, and the neighboring base station transmits the second target positioning assistance data to the LMF.

Step 706: the LMF transmits the first target positioning assistance data and the second target positioning assistance data to the terminal device.

Step 707: the terminal device transmits a first uplink positioning reference signal SRS-Pos to the serving base station according to the first target positioning assistance data, and the terminal device transmits a second uplink positioning reference signal SRS-Pos to the neighboring base station according to the second target positioning assistance data.

Step 708: the terminal device receives, according to the first target positioning assistance data, a first downlink positioning reference signal PRS transmitted by the serving base station, and the terminal device receives, according to the second target positioning assistance data, a second downlink positioning reference signal PRS transmitted by the neighboring base station.

Step 709: the serving base station measures the first uplink positioning reference signal SRS-Pos to obtain a first uplink positioning measurement.

Step 710: the neighboring base station measures the second uplink positioning reference signal SRS-Pos to obtain a second uplink positioning measurement.

Step 711: the terminal device measures the first downlink positioning reference signal PRS from the serving base station to obtain a first downlink positioning measurement, and measures the second downlink positioning reference signal PRS from the neighboring base station to obtain a second downlink positioning measurement.

Step 712: the serving base station transmits the first uplink positioning measurement to the LMF, and the neighboring base station transmits the second uplink positioning measurement to the LMF.

Step 713: the terminal device transmits the first downlink positioning measurement and the second downlink positioning measurement to the LMF.

Step 714: the LMF determines location information of the terminal device according to the first downlink positioning measurement, the second downlink positioning measurement, the first uplink positioning measurement, the second uplink positioning measurement, a location of the serving base station and a location of the neighboring base station.

It will be appreciated that the order of execution between the steps shown in FIG. 7A to FIG. 7C is not limited.

According to a method for positioning a terminal device as provided in an embodiment of the present application, a first message received by an LMF from a terminal device includes positioning QoS information, the LMF transmits the positioning QoS information to a serving base station, the serving base station determines first target positioning assistance data according to the positioning QoS information and transmits the first target positioning assistance data to the terminal device, and the LMF is enabled to acquire a positioning measurement corresponding to the first target positioning assistance data from the terminal device and the serving base station and to determine location information of the terminal device. The serving base station, when assigning the first target positioning assistance data to the terminal device, may consider positioning QoS information of each terminal device, and assign corresponding first target positioning assistance data to each terminal device separately according to the positioning QoS information of each terminal device, instead of uniformly assigning positioning assistance data to all terminal devices. In this way, since the positioning QoS information of each terminal device is taken into consideration to assign the positioning assistance data to that terminal device, not only the positioning precision and the positioning latency can be ensured for the terminal device, but also overheads for system resources and a waste of resources can be reduced.

FIG. 8 is a schematic diagram of a first network element according to an embodiment of the present application. As shown in FIG. 8, a transceiver 800 is configured to receive and transmit data under control of a processor 810.

In FIG. 8, the bus architecture may include any number of interconnected buses and bridges. In particular, various circuits such as one or more processors represented by the processor 810 and a memory represented by the memory 820 are linked together. The bus architecture can also link together a variety of other circuits such as a peripheral device, a voltage regulator and a power management circuit, which are well known in the art and are therefore not described further herein. The bus interface provides an interface. The transceiver 800 may be of elements, that is, including a transmitter and a receiver, to provide devices communicating with various other devices over transmission media; these transmission media include a wireless channel, a wired channel, an optical cable and other transmission media. The processor 810 is responsible for managing the bus architecture and usual processing, and the memory 820 can store data used when the processor 810 performs an operation.

The processor 810 may be a central processing unit (CPU), an application specific integrated circuit (Application Specific Integrated Circuit, ASIC), a field-programmable gate array (Field-Programmable Gate Array, FPGA), or a complex programmable logic device (Complex Programmable Logic Device, CPLD); and the processor can also adopt a multicore architecture.

The processor, by calling a computer program stored in the memory, is configured to execute, based on the executable instruction acquired, the method for positioning a terminal device according to any embodiment of the present application. The processor and the memory can also be physically separated.

The processor 810 is configured to read the computer program in the memory and execute operations of:
  receiving a first message from the terminal device, where the first message includes positioning quality of service QoS information;
  transmitting a second message to a first network device, where the second message includes the positioning QoS information or initial positioning assistance data corresponding to the positioning QoS information;
  receiving first target positioning assistance data transmitted by the first network device, and transmitting the first target positioning assistance data to a second network device, where the first target positioning assistance data is associated with the positioning QoS information;
  receiving a first positioning measurement from the first network device and a second positioning measurement from the second network device, where the first positioning measurement is obtained upon measurement performed by the first network device on an uplink positioning reference signal after receiving the uplink positioning reference signal according to the first target positioning assistance data, and the second positioning measurement is obtained upon measurement performed by the second network device on the uplink positioning reference signal after receiving the uplink positioning reference signal according to the first target positioning assistance data; and determining location information of the terminal device according to the first positioning measurement and the second positioning measurement.

In one embodiment, the second message includes initial positioning assistance data corresponding to the positioning QoS information;

the processor 810 is configured to:

determine a value of a configuration parameter corresponding to the positioning QoS information according to a pre-stored association relationship among the positioning QoS information, a configuration parameter of a positioning reference signal and a threshold value corresponding to the configuration parameter; and determine the value of the configuration parameter as the initial positioning assistance data.

In one embodiment, the first message further includes capability information of the terminal device;

the processor 810 is configured to:

update the threshold value corresponding to the configuration parameter according to the capability information of the terminal device.

In one embodiment, the second message further includes an association relationship among the positioning QoS information, a configuration parameter of a positioning reference signal and a threshold value corresponding to the configuration parameter.

In one embodiment, the second message further includes the updated threshold value corresponding to the configuration parameter.

In one embodiment, the terminal device is at least two in number;

the processor 810 is configured to:

acquire a priority of each terminal device of at least two terminal devices;

determine positioning QoS information of a terminal device of the at least two terminal devices with a highest or lowest priority as target positioning QoS information; and determine a value of a configuration parameter corresponding to the target positioning QoS information according to the pre-stored association relationship among the positioning QoS information, the configuration parameter of the positioning reference signal and the threshold value corresponding to the configuration parameter.

In addition, the processor 810 is further configured to read the computer program in the memory and execute operations of:

receiving a first message from the terminal device, where the first message includes positioning quality of service QoS information;

transmitting a second message to a first network device and a second network device respectively, where the second message includes the positioning QoS information or initial positioning assistance data corresponding to the positioning QoS information;

receiving first target positioning assistance data transmitted by the first network device and second target positioning assistance data transmitted by the second network device, respectively, where both the first target positioning assistance data and the second target positioning assistance data are associated with the positioning QoS information;

transmitting the first target positioning assistance data and the second target positioning assistance data to the terminal device;

receiving a first positioning measurement and a second positioning measurement transmitted by the terminal device, where the first positioning measurement is obtained by the terminal device by receiving, according to the first target positioning assistance data, a first downlink positioning reference signal transmitted by the first network device and measuring the first downlink positioning reference signal, and the second positioning measurement is obtained by the terminal device by receiving, according to the second target positioning assistance data, a second downlink positioning reference signal transmitted by the second network device and measuring the second downlink positioning reference signal; and determining location information of the terminal device according to the first positioning measurement and the second positioning measurement.

In one embodiment, the second message includes initial positioning assistance data corresponding to the positioning QoS information;

the processor 810 is configured to:

determine a value of a configuration parameter corresponding to the positioning QoS information according to a pre-stored association relationship among the positioning QoS information, a configuration parameter of a positioning reference signal and a threshold value corresponding to the configuration parameter; and determine the value of the configuration parameter as the initial positioning assistance data.

In one embodiment, the first message further includes capability information of the terminal device;

the processor 810 is configured to:

update the threshold value corresponding to the configuration parameter according to the capability information of the terminal device.

In one embodiment, the second message further includes an association relationship among the positioning QoS information, a configuration parameter of a positioning reference signal and a threshold value corresponding to the configuration parameter.

In one embodiment, the second message further includes the updated threshold value corresponding to the configuration parameter.

In one embodiment, the terminal device is at least two in number;

the processor 810 is configured to:

acquire a priority of each terminal device of at least two terminal devices;

determine positioning QoS information of a terminal device of the at least two terminal devices with a highest or lowest priority as target positioning QoS information; and determine a value of a configuration parameter corresponding to the target positioning QoS information according to the pre-stored association relationship among the positioning QoS information, the configuration parameter of the positioning reference signal and the threshold value corresponding to the configuration parameter.

To be noted here, the above-described apparatus provided in the present application can implement all the method steps achieved by the foregoing method embodiments, and can achieve the same effect. For the same part and beneficial effect as those in the method embodiments, detailed description is omitted here in the present embodiments.

FIG. 9 is a schematic diagram of a network device according to an embodiment of the present application. As shown in FIG. 9, a transceiver 900 is configured to receive and transmit data under control of a processor 910.

In FIG. 9, the bus architecture may include any number of interconnected buses and bridges. In particular, various circuits such as one or more processors represented by the processor 910 and a memory represented by the memory 920 are linked together. The bus architecture can also link together a variety of other circuits such as a peripheral device, a voltage regulator and a power management circuit, which are well known in the art and are therefore not described further herein. The bus interface provides an interface. The transceiver 900 may be of elements, that is, including a transmitter and a receiver, to provide devices communicating with various other devices over transmission media; these transmission media include a wireless channel, a wired channel, an optical cable and other transmission media. The processor 910 is responsible for managing the bus architecture and usual processing, and the memory 920 can store data used when the processor 910 performs an operation.

The processor 910 may be a central processing unit (CPU), an application specific integrated circuit (Application Specific Integrated Circuit, ASIC), a field-programmable gate array (Field-Programmable Gate Array, FPGA), or a complex programmable logic device (Complex Programmable Logic Device, CPLD); and the processor can also adopt a multicore architecture.

The processor, by calling a computer program stored in the memory, is configured to execute, based on the executable instruction acquired, the method for positioning a terminal device according to any embodiment of the present application. The processor and the memory can also be physically separated.

The processor 910 is configured to read the computer program in the memory and execute operations of:
  receiving a second message transmitted by a first network element, where the second message includes positioning QoS information of the terminal device or initial positioning assistance data corresponding to the positioning QoS information;
  determining first target positioning assistance data according to the positioning QoS information or the initial positioning assistance data, where the first target positioning assistance data is associated with the positioning QoS information;
  transmitting the first target positioning assistance data to the first network element and the terminal device respectively, where the first target positioning assistance data is used to be indicative of transmitting, by the first network element, the first target positioning assistance data to a second network device and receiving a second positioning measurement transmitted by the second network device, where the second positioning measurement is obtained upon measurement performed by the second network device on an uplink positioning reference signal after receiving the uplink positioning reference signal according to the first target positioning assistance data; and
  receiving, according to the first target positioning assistance data, an uplink positioning reference signal transmitted by the terminal device, and measuring the uplink positioning reference signal to obtain a first positioning measurement, and transmitting the first positioning measurement to the first network element.

In one embodiment, the second message includes positioning QoS information of the terminal device;
  the processor 910 is configured to:
  determine a value of a configuration parameter corresponding to the positioning QoS information according to a pre-stored association relationship among the positioning QoS information, a configuration parameter of a positioning reference signal and a threshold value corresponding to the configuration parameter; and
  determine the first target positioning assistance data according to the value of the configuration parameter.

In one embodiment, the second message includes initial positioning assistance data corresponding to the positioning QoS information;
  the processor 910 is configured to:
  adjust the initial positioning assistance data to obtain the first target positioning assistance data; or
  determine the initial positioning assistance data as the first target positioning assistance data.

In one embodiment, the second message further includes an association relationship among the positioning QoS information, a configuration parameter of a positioning reference signal and a threshold value corresponding to the configuration parameter.

In one embodiment, the second message further includes an updated threshold value corresponding to a configuration parameter, and the threshold value is updated by the first network element according to capability information of the terminal device.

In addition, the processor 910 is further configured to read the computer program in the memory and execute operations of:
  receiving a second message transmitted by a first network element, where the second message includes positioning QoS information of the terminal device or initial positioning assistance data corresponding to the positioning QoS information;
  determining first target positioning assistance data according to the positioning QoS information or the initial positioning assistance data, where the first target positioning assistance data is associated with the positioning QoS information; and
  transmitting the first target positioning assistance data to the first network element, where the first target positioning assistance data is used to be indicative of transmitting, by the first network element, the first target positioning assistance data to the terminal device and receiving a first positioning measurement and a second positioning measurement transmitted by the terminal device, and determining location information of the terminal device according to the first positioning measurement and the second positioning measurement; where the first positioning measurement is obtained by the terminal device by receiving, according to the first target positioning assistance data, a first downlink positioning reference signal transmitted by the first network device and measuring the first downlink positioning reference signal, the second positioning measurement is obtained by the terminal device by receiving, according to second target positioning assistance data, a second downlink positioning reference signal transmitted by a second network device and measuring the second downlink positioning reference signal, and the second target positioning assistance data is determined by the second network device.

In one embodiment, the second message includes positioning QoS information of the terminal device;
  the processor 910 is configured to:
    determine a value of a configuration parameter corresponding to the positioning QoS information according to a pre-stored association relationship among the positioning QoS information, a configuration parameter of a positioning reference signal and a threshold value corresponding to the configuration parameter; and
    determine the first target positioning assistance data according to the value of the configuration parameter.

In one embodiment, the second message includes initial positioning assistance data corresponding to the positioning QoS information;
  the processor 910 is configured to:
  adjust the initial positioning assistance data to obtain the first target positioning assistance data; or
  determine the initial positioning assistance data as the first target positioning assistance data.

In one embodiment, the second message further includes an association relationship among the positioning QoS information, a configuration parameter of a positioning reference signal and a threshold value corresponding to the configuration parameter.

In one embodiment, the second message further includes an updated threshold value corresponding to a configuration parameter, and the threshold value is updated by the first network element according to capability information of the terminal device.

To be noted here, the above-described apparatus provided in the present application can implement all the method steps achieved by the foregoing method embodiments, and can achieve the same effect. For the same part and beneficial effect as those in the method embodiments, detailed description is omitted here in the present embodiments.

FIG. 10 is a schematic diagram of an apparatus for positioning a terminal device according to an embodiment of the present application. Exemplarily, reference may be made to FIG. 10, the apparatus 100 for positioning a terminal device can include:
  a receiving device 1001, configured to receive a first message from the terminal device, where the first message includes positioning quality of service QoS information;
  a transmitting device 1002, configured to transmit a second message to a first network device, where the second message includes the positioning QoS information or initial positioning assistance data corresponding to the positioning QoS information;
  where the receiving device 1001 is further configured to receive first target positioning assistance data transmitted by the first network device;
  where the transmitting device 1002 is further configured to transmit the first target positioning assistance data to a second network device, the first target positioning assistance data is associated with the positioning QoS information; and
  where the receiving device 1001 is further configured to receive a first positioning measurement from the first network device and a second positioning measurement from the second network device, the first positioning measurement is obtained upon measurement performed by the first network device on an uplink positioning reference signal after receiving the uplink positioning reference signal according to the first target positioning assistance data, and the second positioning measurement is obtained upon measurement performed by the second network device on the uplink positioning reference signal after receiving the uplink positioning reference signal according to the first target positioning assistance data; and
  a processing device 1003, configured to determine location information of the terminal device according to the first positioning measurement and the second positioning measurement.

In one embodiment, the second message includes initial positioning assistance data corresponding to the positioning QoS information;
  the processing device 1003 is configured to:
    determine a value of a configuration parameter corresponding to the positioning QoS information according to a pre-stored association relationship among the positioning QoS information, a configuration parameter of a positioning reference signal and a threshold value corresponding to the configuration parameter; and
    determine the value of the configuration parameter as the initial positioning assistance data.

In one embodiment, the first message further includes capability information of the terminal device;
  the processing device 1003 is configured to update the threshold value corresponding to the configuration parameter according to the capability information of the terminal device.

In one embodiment, the second message further includes an association relationship among the positioning QoS information, a configuration parameter of a positioning reference signal and a threshold value corresponding to the configuration parameter.

In one embodiment, the second message further includes the updated threshold value corresponding to the configuration parameter.

In one embodiment, the terminal device is at least two in number;
  the processing device 1003 is configured to:
  acquire a priority of each terminal device of at least two terminal devices;
  determine positioning QoS information of a terminal device of the at least two terminal devices with a highest or lowest priority as target positioning QoS information; and
  determine a value of a configuration parameter corresponding to the target positioning QoS information according to the pre-stored association relationship among the positioning QoS information, the configuration parameter of the positioning reference signal and the threshold value corresponding to the configuration parameter.

To be noted here, the above-described apparatus provided in the present application can implement all the method steps achieved by the foregoing method embodiments, and can achieve the same effect. For the same part and beneficial effect as those in the method embodiments, detailed description is omitted here in the present embodiments.

It should be noted that the division of the devices in the embodiments of the present application is merely exemplary, and is a division of logical functions, moreover, there may be other divisions during actual implementations. In addition, functional devices in the embodiments of the present application may be integrated into one processing unit, or each of the units may exist alone physically, or two or more units are integrated into one unit. The integrated unit may be implemented in a form of hardware, or may be implemented in a form of a software functional unit.

The described integrated unit, if being implemented in a form of a software functional unit and sold or used as an independent product, may be stored in a processor-readable storage medium. Based on such understanding, the embodiments of the present application essentially, or the part contributing to the prior art, or all or a part of the embodiments may be embodied in a form of a software product. The computer software product is stored in a storage medium, and includes several instructions enabling a computer device (which may be a personal computer, a server, or a network device) or a processor (processor) to perform all or a part of the steps of the methods described in the embodiments of the present application. The foregoing storage medium includes: any medium capable of storing program codes, such as a USB flash disk, a mobile hard disk, a read-only memory (Read-Only Memory, ROM), a random access memory (Random Access Memory, RAM), a magnetic disk, or an optical disc.

FIG. 11 is a schematic diagram of another apparatus for positioning a terminal device according to an embodiment of the present application. Exemplarily, reference may be made to FIG. 11, the apparatus 110 for positioning a terminal device can include:

a receiving device 1101, configured to receive a first message from the terminal device, where the first message includes positioning quality of service QoS information;

a transmitting device 1102, configured to transmit a second message to a first network device and a second network device respectively, where the second message includes the positioning QoS information or initial positioning assistance data corresponding to the positioning QoS information;

where the receiving device 1101 is further configured to receive first target positioning assistance data transmitted by the first network device and second target positioning assistance data transmitted by the second network device, respectively; both the first target positioning assistance data and the second target positioning assistance data are associated with the positioning QoS information;

where the transmitting device 1102 is further configured to transmit the first target positioning assistance data and the second target positioning assistance data to the terminal device;

where the receiving device 1101 is further configured to receive a first positioning measurement and a second positioning measurement transmitted by the terminal device, the first positioning measurement is obtained by the terminal device by receiving, according to the first target positioning assistance data, a first downlink positioning reference signal transmitted by the first network device and measuring the first downlink positioning reference signal, and the second positioning measurement is obtained by the terminal device by receiving, according to the second target positioning assistance data, a second downlink positioning reference signal transmitted by the second network device and measuring the second downlink positioning reference signal; and a processing device 1103, configured to determine location information of the terminal device according to the first positioning measurement and the second positioning measurement.

In one embodiment, the second message includes initial positioning assistance data corresponding to the positioning QoS information;

the processing device 1103 is configured to:
determine a value of a configuration parameter corresponding to the positioning QoS information according to a pre-stored association relationship among the positioning QoS information, a configuration parameter of a positioning reference signal and a threshold value corresponding to the configuration parameter; and
determine the value of the configuration parameter as the initial positioning assistance data.

In one embodiment, the first message further includes capability information of the terminal device;
the processing device 1103 is configured to update the threshold value corresponding to the configuration parameter according to the capability information of the terminal device.

In one embodiment, the second message further includes an association relationship among the positioning QoS information, a configuration parameter of a positioning reference signal and a threshold value corresponding to the configuration parameter.

In one embodiment, the second message further includes the updated threshold value corresponding to the configuration parameter.

In one embodiment, the terminal device is at least two in number;
the processing device 1103 is configured to:
acquire a priority of each terminal device of at least two terminal devices;
determine positioning QoS information of a terminal device of the at least two terminal devices with a highest or lowest priority as target positioning QoS information; and
determine a value of a configuration parameter corresponding to the target positioning QoS information according to the pre-stored association relationship among the positioning QoS information, the configuration parameter of the positioning reference signal and the threshold value corresponding to the configuration parameter.

To be noted here, the above-described apparatus provided in the present application can implement all the method steps achieved by the foregoing method embodiments, and can achieve the same effect. For the same part and beneficial effect as those in the method embodiments, detailed description is omitted here in the present embodiments.

It should be noted that the division of the devices in the embodiments of the present application is merely exemplary, and is a division of logical functions, moreover, there may be other divisions during actual implementations. In addition, functional devices in the embodiments of the present application may be integrated into one processing unit, or each of the units may exist alone physically, or two or more units are integrated into one unit. The integrated unit may be implemented in a form of hardware, or may be implemented in a form of a software functional unit.

The described integrated unit, if being implemented in a form of a software functional unit and sold or used as an independent product, may be stored in a processor-readable storage medium. Based on such understanding, the embodiments of the present application essentially, or the part contributing to the prior art, or all or a part of the embodiments may be embodied in a form of a software product. The computer software product is stored in a storage medium, and includes several instructions enabling a computer device (which may be a personal computer, a server, or a network device) or a processor (processor) to perform all or a part of the steps of the methods described in the embodiments of the present application. The foregoing storage medium includes: any medium capable of storing program codes, such as a USB flash disk, a mobile hard disk, a read-only memory (Read-Only Memory, ROM), a random access memory (Random Access Memory, RAM), a magnetic disk, or an optical disc.

FIG. 12 is a schematic diagram of yet another apparatus for positioning a terminal device according to an embodiment of the present application. Exemplarily, reference may be made to FIG. 12, the apparatus 120 for positioning a terminal device can include:

- a receiving device 1201, configured to receive a second message transmitted by a first network element, where the second message includes positioning QoS information of the terminal device or initial positioning assistance data corresponding to the positioning QoS information;
- a processing device 1202, configured to determine first target positioning assistance data according to the positioning QoS information or the initial positioning assistance data, where the first target positioning assistance data is associated with the positioning QoS information; and
- a transmitting device 1203, configured to transmit the first target positioning assistance data to the first network element and the terminal device respectively, where the first target positioning assistance data is used to be indicative of transmitting, by the first network element, the first target positioning assistance data to a second network device and receiving a second positioning measurement transmitted by the second network device, where the second positioning measurement is obtained upon measurement performed by the second network device on an uplink positioning reference signal after receiving the uplink positioning reference signal according to the first target positioning assistance data;
- where the receiving device 1201 is further configured to receive, according to the first target positioning assistance data, an uplink positioning reference signal transmitted by the terminal device, and measure the uplink positioning reference signal to obtain a first positioning measurement; and
- where the transmitting device 1203 is further configured to transmit the first positioning measurement to the first network element.

In one embodiment, the second message includes positioning QoS information of the terminal device;

the processing device 1202 is configured to:
determine a value of a configuration parameter corresponding to the positioning QoS information according to a pre-stored association relationship among the positioning QoS information, a configuration parameter of a positioning reference signal and a threshold value corresponding to the configuration parameter; and
determine the first target positioning assistance data according to the value of the configuration parameter.

In one embodiment, the second message includes initial positioning assistance data corresponding to the positioning QoS information;

the processing device 1202 is configured to:
adjust the initial positioning assistance data to obtain the first target positioning assistance data; or
determine the initial positioning assistance data as the first target positioning assistance data.

In one embodiment, the second message further includes an association relationship among the positioning QoS information, a configuration parameter of a positioning reference signal and a threshold value corresponding to the configuration parameter.

In one embodiment, the second message further includes an updated threshold value corresponding to a configuration parameter, and the threshold value is updated by the first network element according to capability information of the terminal device.

To be noted here, the above-described apparatus provided in the present application can implement all the method steps achieved by the foregoing method embodiments, and can achieve the same effect. For the same part and beneficial effect as those in the method embodiments, detailed description is omitted here in the present embodiments.

It should be noted that the division of the units in the embodiments of the present application is merely exemplary, and is a division of logical functions, moreover, there may be other divisions during actual implementations. In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The described integrated unit, if being implemented in a form of a software functional unit and sold or used as an independent product, may be stored in a processor-readable storage medium. Based on such understanding, the embodiments of the present application essentially, or the part contributing to the prior art, or all or a part of the technical solutions may be embodied in a form of a software product. The computer software product is stored in a storage medium, and includes several instructions enabling a computer device (which may be a personal computer, a server, or a network device) or a processor (processor) to perform all or a part of the steps of the methods described in the embodiments of the present application. The foregoing storage medium includes: any medium capable of storing program codes, such as a USB flash disk, a mobile hard disk, a read-only memory (Read-Only Memory, ROM), a random access memory (Random Access Memory, RAM), a magnetic disk, or an optical disc.

FIG. 13 is a schematic diagram of yet another apparatus for positioning a terminal device according to an embodiment of the present application. Exemplarily, reference may be made to FIG. 13, the apparatus 130 for positioning a terminal device can include:

- a receiving device 1301, configured to receive a second message transmitted by a first network element, where the second message includes positioning QoS information of the terminal device or initial positioning assistance data corresponding to the positioning QoS information;
- a processing device 1302, configured to determine first target positioning assistance data according to the positioning QoS information or the initial positioning assistance data, where the first target positioning assistance data is associated with the positioning QoS information; and
- a transmitting device 1303, configured to transmit the first target positioning assistance data to the first network element, where the first target positioning assistance data is used to be indicative of transmitting, by the first network element, the first target positioning assistance data to the terminal device and receiving a first positioning measurement and a second positioning measurement transmitted by the terminal device, and determining location information of the terminal device according to the first positioning measurement and the second positioning measurement; where the first positioning measurement is obtained by the terminal device by receiving, according to the first target positioning assistance data, a first downlink positioning reference signal transmitted by the first network device and measuring the first downlink positioning reference signal, the second positioning measurement is obtained by the terminal device by receiving, according to second target positioning assistance data, a second downlink positioning reference signal transmitted by a second network device and measuring the second downlink positioning reference signal, and the second target positioning assistance data is determined by the second network device.

In one embodiment, the second message includes positioning QoS information of the terminal device;

the processing device 1302 is configured to:

determine a value of a configuration parameter corresponding to the positioning QoS information according to a pre-stored association relationship among the positioning QoS information, a configuration parameter of a positioning reference signal and a threshold value corresponding to the configuration parameter; and determine the first target positioning assistance data according to the value of the configuration parameter.

In one embodiment, the second message includes initial positioning assistance data corresponding to the positioning QoS information;

the processing device 1302 is configured to:

adjust the initial positioning assistance data to obtain the first target positioning assistance data; or determine the initial positioning assistance data as the first target positioning assistance data.

In one embodiment, the second message further includes an association relationship among the positioning QoS information, a configuration parameter of a positioning reference signal and a threshold value corresponding to the configuration parameter.

In one embodiment, the second message further includes an updated threshold value corresponding to a configuration parameter, and the threshold value is updated by the first network element according to capability information of the terminal device.

To be noted here, the above-described terminal provided in the present application can implement all the method steps achieved by the secondary positioning terminal in the foregoing method embodiments, and can achieve the same effect. For the same part and beneficial effect as those in the method embodiments, detailed description is omitted here in the present embodiments.

It should be noted that the division of the units in the embodiments of the present application is merely exemplary, and is a division of logical functions, moreover, there may be other divisions during actual implementations. In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

The described integrated unit, if being implemented in a form of a software functional unit and sold or used as an independent product, may be stored in a processor-readable storage medium. Based on such understanding, the embodiments of the present application essentially, or the part contributing to the prior art, or all or a part of the embodiments may be embodied in a form of a software product. The computer software product is stored in a storage medium, and includes several instructions enabling a computer device (which may be a personal computer, a server, or a network device) or a processor (processor) to perform all or a part of the steps of the methods described in the embodiments of the present application. The foregoing storage medium includes: any medium capable of storing program codes, such as a USB flash disk, a mobile hard disk, a read-only memory (Read-Only Memory, ROM), a random access memory (Random Access Memory, RAM), a magnetic disk, or an optical disc.

An embodiment of the present application further provides a processor-readable storage medium in which a computer program is stored, where the computer program is configured to enable the processor to execute the method for positioning a terminal device according to the foregoing method embodiments.

An embodiment of the present application further provides a computer program product including a computer program, where the computer program, when being executed by a processor, implements the method for positioning a terminal device according to any one of the foregoing possible implementations.

The processor-readable storage medium may be any available medium or data storage device accessible to the processor, including but not limited to a magnetic memory (such as a floppy disk, a hard disk, a magnetic tape, a magnetic optical disk (MO) or the like), an optical memory (such as a CD, a DVD, a BD, an HVD or the like), and a semiconductor memory (such as a ROM, an EPROM, an EEPROM, a non-volatile memory (NAND FLASH), a solid-state disk (SSD)) and the like.

The embodiments of the present application may be provided as methods, systems, or computer program products. Accordingly, the present application may take the form of complete hardware embodiments, complete software embodiments, or a combination of software and hardware embodiments. Further, the present application may take the form of computer program products implemented on one or more computer-usable storage media (including but not limited to disk memories and optical memories, etc.) containing computer-usable program codes.

The present application is described with reference to flowcharts and/or block diagrams of methods, apparatuses (system) and computer program products according to embodiments of the present application. It will be appreciated that computer-executable instructions can implement each flow and/or block in the flowcharts and/or the block diagrams, and a combination of a flow and/or a block in the flowcharts and/or the block diagrams. These computer-executable instructions may be provided to a processor of a general purpose computer, a special purpose computer, an embedded processor or other programmable data processing devices to generate a machine, and instructions executed by the processor of the computers or other programmable data processing devices generate a device for performing functions specified in one or more flows of the flowcharts and/or one or more blocks of the block diagrams.

These processor-executable instructions may also be stored in a processor-readable memory capable of directing the computers or other programmable data processing devices to operate in a specific manner, and instructions stored in the processor-readable memory generate a manufactured product including an instruction device, where the instruction device performs functions specified in one or more flows of the flowcharts and/or one or more blocks of the block diagrams.

These processor-executable instructions may also be loaded on the computers or other programmable data processing devices, and a series of operation steps are performed in the computers or other programmable devices to generate a computer-implemented process, and thus the instructions executed on the computers or other programmable devices provide steps for performing the functions specified in one or more flows of the flowcharts and/or one or more blocks of the block diagrams.

The invention claimed is:

1. A method for positioning a terminal device, the method being applied to a first network element and comprising:
receiving a first message from the terminal device, wherein the first message comprises positioning quality of service (QoS) information;
transmitting a second message to a first network device and a second network device respectively, wherein the second message comprises the positioning QoS information or initial positioning assistance data corresponding to the positioning QoS information;
receiving first target positioning assistance data transmitted by the first network device and second target positioning assistance data transmitted by the second network device, respectively, wherein both the first target positioning assistance data and the second target positioning assistance data are associated with the positioning QoS information;
transmitting the first target positioning assistance data and the second target positioning assistance data to the terminal device;
receiving a first positioning measurement and a second positioning measurement transmitted by the terminal device, wherein the first positioning measurement is obtained by the terminal device by receiving, according to the first target positioning assistance data, a first downlink positioning reference signal transmitted by the first network device and measuring the first downlink positioning reference signal, and the second positioning measurement is obtained by the terminal device by receiving, according to the second target positioning assistance data, a second downlink positioning reference signal transmitted by the second network device and measuring the second downlink positioning reference signal; and
determining location information of the terminal device according to the first positioning measurement and the second positioning measurement.

2. The method according to claim 1, wherein the second message comprises initial positioning assistance data corresponding to the positioning QoS information;
before the transmitting the second message to the first network device and the second network device respectively, the method further comprises:
determining a value of a configuration parameter corresponding to the positioning QoS information according to a pre-stored association relationship among the positioning QoS information, a configuration parameter of a positioning reference signal and a threshold value corresponding to the configuration parameter; and
determining the value of the configuration parameter as initial positioning assistance data.

3. The method according to claim 2, wherein the first message further comprises capability information of the terminal device;
the method further comprises:
updating the threshold value corresponding to the configuration parameter according to the capability information of the terminal device.

4. The method according to claim 1, wherein the second message further comprises an association relationship among the positioning QoS information, a configuration parameter of a positioning reference signal and a threshold value corresponding to the configuration parameter.

5. The method according to claim 3, wherein the second message further comprises updated threshold value corresponding to the configuration parameter.

6. The method according to claim 2, wherein the terminal device is at least two in number;
the method further comprises:
acquiring a priority of each terminal device of at least two terminal devices;
the determining the value of the configuration parameter corresponding to the positioning QoS information according to the pre-stored association relationship among the positioning QoS information, the configuration parameter of the positioning reference signal and the threshold value corresponding to the configuration parameter comprises:
determining positioning QoS information of a terminal device of the at least two terminal devices with a highest or lowest priority as target positioning QoS information; and
determining a value of a configuration parameter corresponding to the target positioning QoS information according to the pre-stored association relationship among the positioning QoS information, the configuration parameter of the positioning reference signal and the threshold value corresponding to the configuration parameter.

7. A method for positioning a terminal device, the method being applied to a first network device and comprising:
receiving a second message transmitted by a first network element, wherein the second message comprises positioning quality of service (QoS) information of the terminal device or initial positioning assistance data corresponding to the positioning QoS information;
determining first target positioning assistance data according to the positioning QoS information or initial positioning assistance data, wherein the first target positioning assistance data is associated with the positioning QoS information; and
transmitting the first target positioning assistance data to the first network element, wherein the first target positioning assistance data is used to be indicative of transmitting, by the first network element, the first target positioning assistance data to the terminal device and receiving a first positioning measurement and a second positioning measurement transmitted by the terminal device, and determining location information of the terminal device according to the first positioning measurement and the second positioning measurement; wherein the first positioning measurement is obtained by the terminal device by receiving, according to the first target positioning assistance data, a first downlink positioning reference signal transmitted by the first network device and measuring the first downlink positioning reference signal, the second positioning measurement is obtained by the terminal device by receiving, according to second target positioning assistance data, a second downlink positioning reference signal transmitted by a second network device and measuring the second downlink positioning reference signal, and the second target positioning assistance data is determined by the second network device.

8. The method according to claim 7, wherein the second message comprises positioning QoS information of the terminal device;
the determining the first target positioning assistance data according to the positioning QoS information comprises:
determining a value of a configuration parameter corresponding to the positioning QoS information according to a pre-stored association relationship among the positioning QoS information, a configuration parameter of a positioning reference signal and a threshold value corresponding to the configuration parameter; and
determining the first target positioning assistance data according to the value of the configuration parameter.

9. The method according to claim 7, wherein the second message comprises initial positioning assistance data corresponding to the positioning QoS information;
the determining the first target positioning assistance data according to an initial positioning assistance data comprises:
adjusting the initial positioning assistance data to obtain the first target positioning assistance data; or
determining the initial positioning assistance data as the first target positioning assistance data.

10. The method according to claim 8, wherein the second message further comprises an association relationship among the positioning QoS information, a configuration parameter of a positioning reference signal and a threshold value corresponding to the configuration parameter.

11. The method according to claim 7, wherein the second message further comprises an updated threshold value corresponding to a configuration parameter, and a threshold value is updated by the first network element according to capability information of the terminal device.

12. An apparatus for positioning a terminal device, comprising a memory, a transceiver and a processor:
wherein the memory is configured to store a computer program; the transceiver is configured to transceive data under control of the processor; and the processor is configured to read the computer program in the memory and execute operations of:
receiving a first message from the terminal device, wherein the first message comprises positioning quality of service (QoS) information;
transmitting a second message to a first network device and a second network device respectively, wherein the second message comprises the positioning QoS information or initial positioning assistance data corresponding to the positioning QoS information;
receiving first target positioning assistance data transmitted by the first network device and second target positioning assistance data transmitted by the second network device, respectively, wherein both the first target positioning assistance data and the second target positioning assistance data are associated with the positioning QoS information;
transmitting the first target positioning assistance data and the second target positioning assistance data to the terminal device;
receiving a first positioning measurement and a second positioning measurement transmitted by the terminal device, wherein the first positioning measurement is obtained by the terminal device by receiving, according to the first target positioning assistance data, a first downlink positioning reference signal transmitted by the first network device and measuring the first downlink positioning reference signal, and the second positioning measurement is obtained by the terminal device by receiving, according to the second target positioning assistance data, a second downlink positioning reference signal transmitted by the second network device and measuring the second downlink positioning reference signal; and
determining location information of the terminal device according to the first positioning measurement and the second positioning measurement.

13. The apparatus according to claim 12, wherein the second message comprises initial positioning assistance data corresponding to the positioning QoS information;
the processor is specifically configured to:
determine a value of a configuration parameter corresponding to the positioning QoS information according to a pre-stored association relationship among the positioning QoS information, a configuration parameter of a positioning reference signal and a threshold value corresponding to the configuration parameter; and
determine the value of the configuration parameter as the initial positioning assistance data.

14. The apparatus according to claim 13, wherein the first message further comprises capability information of the terminal device;
the processor is specifically configured to:
update the threshold value corresponding to the configuration parameter according to the capability information of the terminal device.

15. The apparatus according to claim 12, wherein the second message further comprises an association relationship among the positioning QoS information, a configuration parameter of a positioning reference signal and a threshold value corresponding to the configuration parameter.

16. The apparatus according to claim 14, wherein the second message further comprises an updated threshold value corresponding to the configuration parameter.

17. The apparatus according to claim 13, wherein the terminal device is at least two in number;
the processor is specifically configured to:
acquire a priority of each terminal device of at least two terminal devices;
determine positioning QoS information of a terminal device of the at least two terminal devices with a highest or lowest priority as target positioning QoS information; and
determine a value of a configuration parameter corresponding to the target positioning QoS information according to the pre-stored association relationship among the positioning QoS information, the configuration parameter of the positioning reference signal and the threshold value corresponding to the configuration parameter.

18. An apparatus for positioning a terminal device, comprising a memory, a transceiver and a processor:
wherein the memory is configured to store a computer program; the transceiver is configured to transceive data under control of the processor; and the processor is configured to read the computer program in the memory and execute the method according to claim 7.

19. A non-transitory processor-readable storage medium in which a computer program is stored, wherein the computer program is configured to enable a processor to execute the method according to claim 1.

20. A non-transitory processor-readable storage medium in which a computer program is stored, wherein the computer program is configured to enable a processor to execute the method according to claim 7.

* * * * *